(12) United States Patent
Dyckrup

(10) Patent No.: US 8,931,733 B2
(45) Date of Patent: Jan. 13, 2015

(54) WING FOR AN AIRCRAFT

(75) Inventor: Werner Dyckrup, Visbek (DE)

(73) Assignee: Airbus Operations GmbH, Hamburg (DE)

( * ) Notice: Subject to any disclaimer, the term of this patent is extended or adjusted under 35 U.S.C. 154(b) by 634 days.

(21) Appl. No.: 12/988,967

(22) PCT Filed: Apr. 23, 2009

(86) PCT No.: PCT/EP2009/002965
§ 371 (c)(1),
(2), (4) Date: Dec. 1, 2010

(87) PCT Pub. No.: WO2009/130026
PCT Pub. Date: Oct. 29, 2009

(65) Prior Publication Data
US 2011/0101172 A1    May 5, 2011

Related U.S. Application Data

(60) Provisional application No. 61/047,118, filed on Apr. 23, 2008.

(30) Foreign Application Priority Data

Apr. 23, 2008  (DE) .................. 10 2008 020 390

(51) Int. Cl.
*B64C 39/12* (2006.01)
*B64C 3/38* (2006.01)
(Continued)

(52) U.S. Cl.
CPC .... *B64C 9/02* (2013.01); *B64C 7/00* (2013.01)
USPC ........... 244/45 R; 244/213; 244/216; 244/218

(58) Field of Classification Search
CPC ........ B64C 3/56; B64C 2201/102; B64C 3/18
USPC ...... 244/45 R, 46, 49, 123.11, 124, 130, 131, 244/132, 218, 201, 213, 216; 180/346
See application file for complete search history.

(56) References Cited

U.S. PATENT DOCUMENTS 2,526,929 A    10/1950  Bowcott
4,739,954 A *   4/1988  Hamilton ................... 244/123.1
(Continued)

FOREIGN PATENT DOCUMENTS

CN    1982157 A    6/2007
DE    29706823 U1  10/1997
(Continued)

OTHER PUBLICATIONS

International Search Report for corresponding PCT Application No. PCT/EP2009/002965, Nov. 24, 2009.
(Continued)

*Primary Examiner* — Rob Swiatek
*Assistant Examiner* — George Andonyan
(74) *Attorney, Agent, or Firm* — Ingrassia Fisher & Lorenz, P.C.

(57) ABSTRACT

An aerodynamic body that can be adjusted relative to a main wing of an aircraft by an adjusting device is provided. A gap between the aerodynamic body and another aerodynamic body or a component of the fuselage or the main wing is formed on one lateral end and said and the gap is variable due to the adjustability of the aerodynamic body. The body features a gap bridge-over device with a shell part that extends along the gap and overlaps the outer shell of the aerodynamic body in the wingspread direction on the front side thereof so that the shell part can be telescopically moved relative to this aerodynamic body in the wingspread direction. An airfoil for an aircraft with a main wing and a plurality of aerodynamic bodies that are arranged adjacent to one another transverse to the chord direction is also provided.

17 Claims, 15 Drawing Sheets

(51) Int. Cl.
*B64C 7/00* (2006.01)
*B64C 9/02* (2006.01)

(56) References Cited

U.S. PATENT DOCUMENTS

| | | | | |
|---|---|---|---|---|
| 4,824,053 | A * | 4/1989 | Sarh | 244/218 |
| 4,863,117 | A * | 9/1989 | Riout | 244/48 |
| 5,176,339 | A * | 1/1993 | Schmidt | 244/54 |
| 5,222,692 | A * | 6/1993 | Glowacki | 244/53 R |
| 5,356,094 | A * | 10/1994 | Sylvain | 244/49 |
| 5,695,154 | A * | 12/1997 | Castellucci et al. | 244/130 |
| 5,845,877 | A * | 12/1998 | Justice et al. | 244/131 |
| 6,076,766 | A * | 6/2000 | Gruensfelder | 244/49 |
| 6,098,927 | A * | 8/2000 | Gevers | 244/123.8 |
| 6,145,791 | A * | 11/2000 | Diller et al. | 244/215 |
| 6,209,824 | B1 | 4/2001 | Caton | |
| 7,546,984 | B2 | 6/2009 | Poppe | |
| 7,699,266 | B2 | 4/2010 | Martin Hernandez | |
| 7,866,610 | B2 * | 1/2011 | Bousfield | 244/218 |
| 8,292,236 | B2 * | 10/2012 | Wildman | 244/216 |
| 2006/0022093 | A1 | 2/2006 | Poppe | |
| 2008/0169382 | A1 | 7/2008 | Martin Hernandez | |
| 2009/0026321 | A1 * | 1/2009 | Sarh et al. | 244/218 |
| 2010/0170998 | A1 | 7/2010 | Lacy | |
| 2012/0018588 | A1 | 1/2012 | Lacy | |

FOREIGN PATENT DOCUMENTS

| | | |
|---|---|---|
| DE | 102004035921 A1 | 2/2006 |
| DE | 102006036389 A1 | 2/2008 |
| EP | 1857359 A | 11/2007 |
| RU | 2187445 C1 | 8/2002 |

OTHER PUBLICATIONS

Office Action for corresponding CN application No. 200980114638.5, dated Oct. 30, 2012.

State Intellectual Property Office of the People's Republic of China, Office Action in Chinese Patent Application No. 200980114638.5, mailed Aug. 20, 2013.

Japanese Patent Office, Office Action in Japanese Patent Application No. 2011-505431, mailed Jul. 30, 2013.

German Patent and Trade Mark Office, German Office Action for German Patent Application No. 102008020390.4, mailed Apr. 28, 2010.

International Searching Authority, Written Opinion for International Application No. PCT/EP2009/002965, mailed Oct. 26, 2010.

International Searching Authority, International Preliminary Report on Patentability Chapter I for International Application No. PCT/EP2009/002965, mailed Oct. 26, 2010.

* cited by examiner

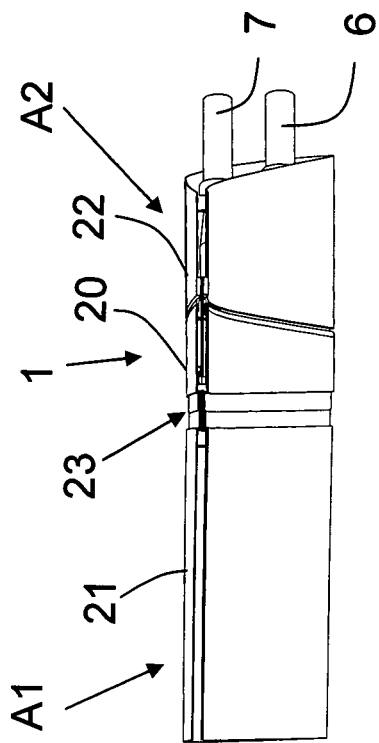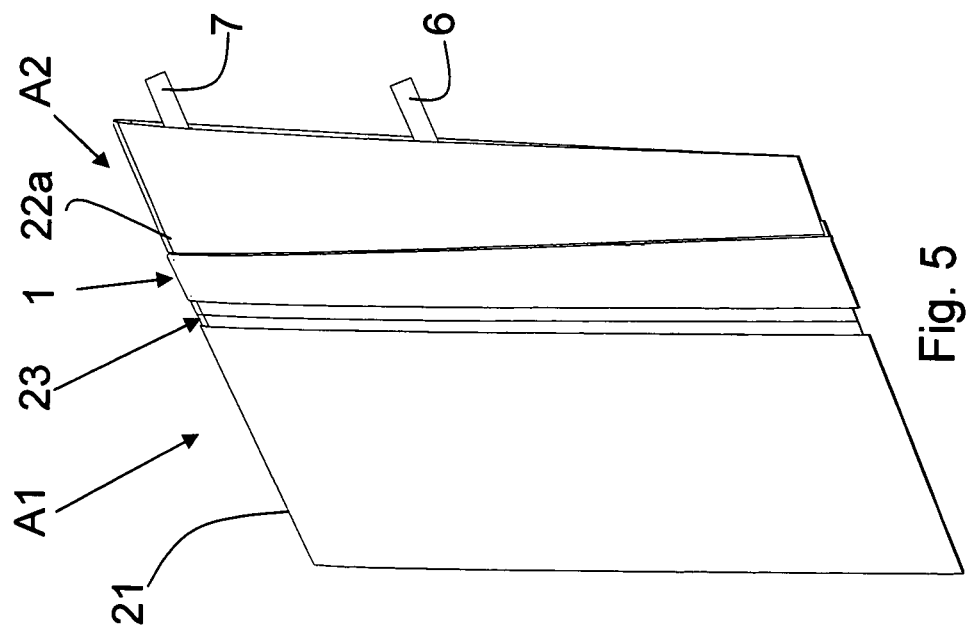

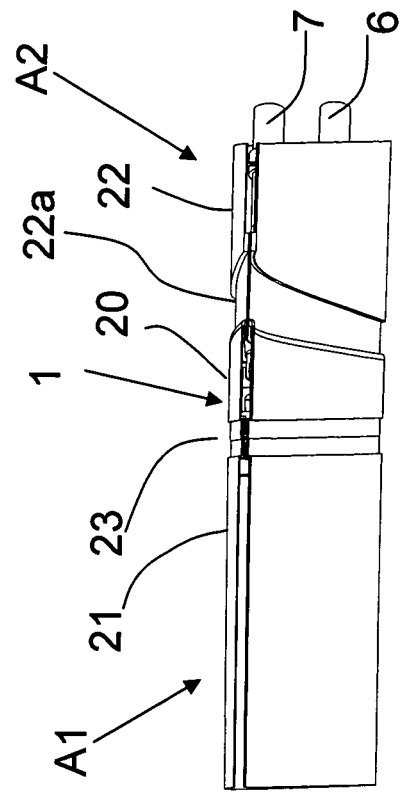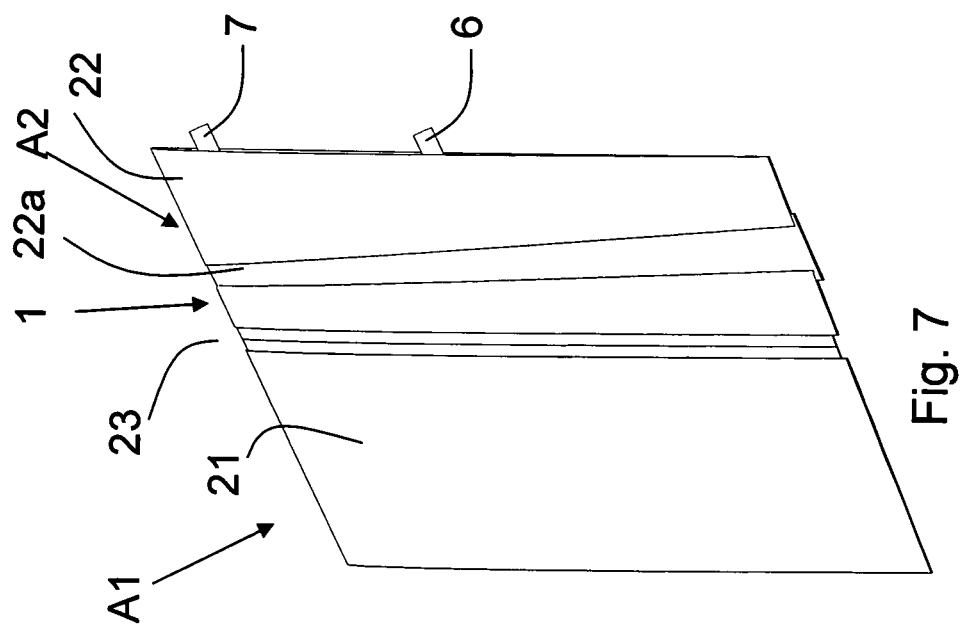

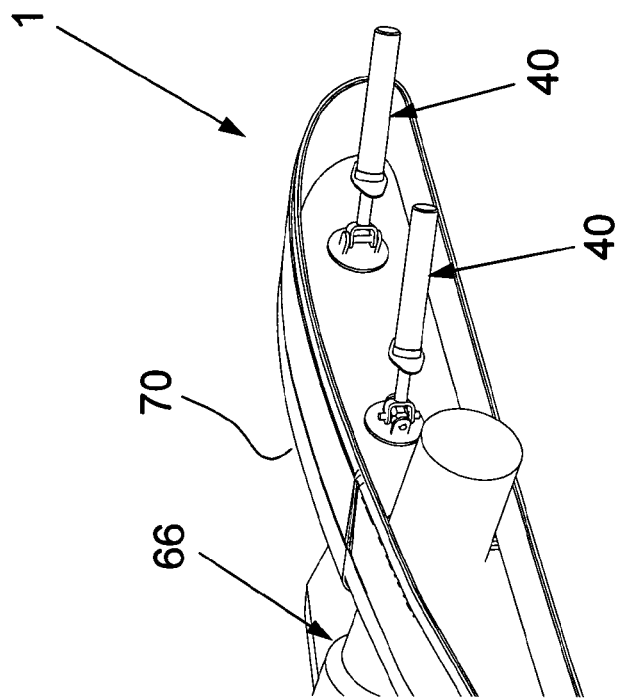
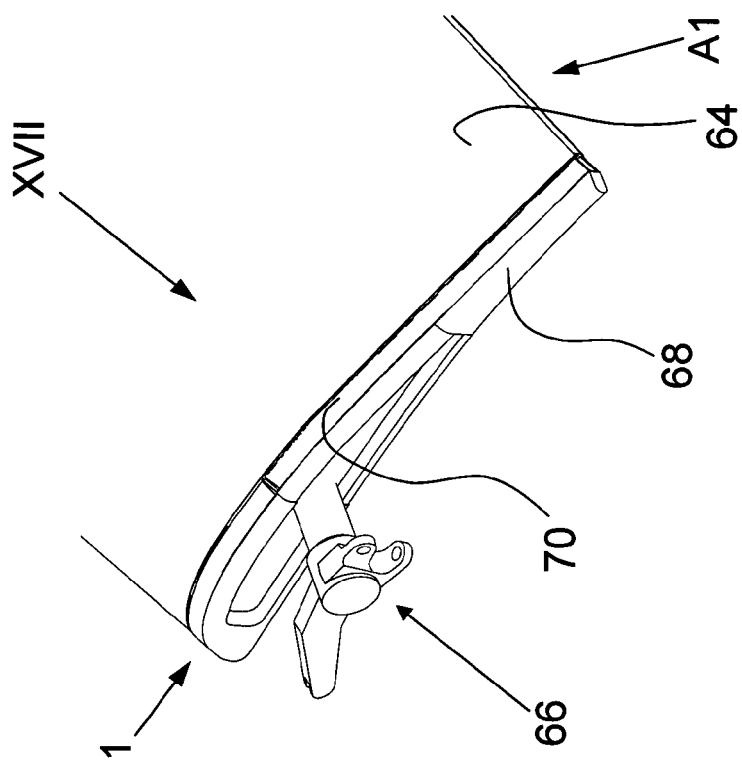
Fig. 16
Fig. 17

WING FOR AN AIRCRAFT

CROSS REFERENCE TO RELATED APPLICATIONS

This application claims priority to PCT Application No. PCT/EP2009/002965, filed April 23, 2009; which claims priority to German Patent Application No. DE 10 2008 020 390.4, filed April 23, 2008, and claims the benefit to U.S. Provisional Patent Application No. 61/047,118, filed April 23, 2008, the entire disclosures of which applications are hereby incorporated by reference.

BACKGROUND

The present invention pertains to an airfoil of an aircraft, to a high-lift system, as well as to an aircraft with the high-lift system.

US 2006/0022093 A1 describes an interconnection system for flaps which are located side-by-side, on an aircraft wing.

Airfoils of aircraft, e.g., winged aircraft, feature a main wing with at least one aerodynamic body that can be adjusted relative to the main wing and respectively has an aerodynamically active profile. It is common practice to provide a plurality of aerodynamic bodies that can be adjusted relative to the main wing and are arranged adjacent to one another transverse to the chord direction of the main wing such that a gap is formed between the facing ends of the outer shell or between the facing front sides of the aerodynamic bodies, wherein said gap is variable due to the adjustability of the aerodynamic bodies. The aerodynamic bodies may consist of flaps such as, e.g., ailerons, spoilers or high-lift flaps or even of slats. The airfoil usually features a wing unit, to which the aerodynamic bodies are coupled in an adjustable fashion. In this case, the wing unit forms a stationary system or reference system referred to the movable wing components.

In known airfoils with high-lift flaps, these flaps are simultaneously adjusted equidirectionally, wherein a downwardly directed flap excursion takes place. Due to the shape of the main wing, the high-lift flaps are not adjusted parallel to one another such that the adjacently positioned front sides of the high-lift flaps move relative to one another and the size and the shape of the variable gap change. If the high-lift flaps are in a zero degree position, in which the high-lift flaps are retracted, the mutual distances between the front sides on the front and rear edges and therefore the gap can be very small and approximately equal to zero. When the high-lift flaps are extended, the gap being formed between the high-lift flaps can be significantly enlarged depending on the position of extension or the state of adjustment of the high-lift flaps.

In a high-lift flap that is positioned, e.g., near an outer [text missing], i.e., near the fuselage or the wing end, such that its front side is positioned adjacent to a component of the fuselage or a component of the main wing, a gap exists between the component of the fuselage or the main wing. This gap also varies with respect to its size and its shape depending on the state of adjustment of the high-lift flap.

Such a gap impairs the aerodynamic quality of the wing, i.e., the entire wing arrangement, particularly if it exceeds a certain size. For these reasons, it is desirable to avoid or to prevent said gap as far as possible.

Sealing devices known from the general state of the art seal the movable wing components relative to one another or the movable wing components relative to a stationary structural component by means of special deformable sealing profiles. However, the limits of such a sealing concept are exceeded if significant variations in the size and shape of the gap occur as described above. An effective gap seal cannot be realized with sufficient quality in this case. In addition, the deformation of the sealing profiles leads to an undesirable and likewise disadvantageous change of the contour of the aerodynamic profile in the gap region.

SUMMARY OF THE INVENTION

It is the objective of the invention to make available an airfoil with adjustable aerodynamic bodies arranged thereon, as well as a high-lift system and an aircraft with such an airfoil, by means of which the impairment of the aerodynamic properties caused by the formation of intermediate spaces or gaps on the aerodynamic bodies is minimized.

This objective is attained with the characteristics of one or more embodiments disclosed and described herein. Other embodiments are disclosed and described herein.

According to the invention, a gap bridge-over device with a shell part is provided for bridging over or covering the gap at least in certain adjusting ranges of the aerodynamic body or the aerodynamic bodies, respectively. The gap can be bridged over or covered or at least partially sealed over a broad adjusting range of the aerodynamic bodies by means of a continuous displacement of the shell part of the gap bridge-over device such that an excellent adaptation to a variety of operating conditions can be achieved. It is furthermore possible to realize the gap bridge-over device in the form of a rigid body, i.e., with low elasticity. In this case, the shape of the shell part may be realized such that it is very precisely adapted to the contour of the outer side or the inner side of the shell of the aerodynamic body with relatively high dimensional accuracy. Consequently, an airfoil with optimized aerodynamic properties is made available.

According to the invention, it is proposed to provide the following: an aerodynamic body that features a gap bridge-over device with a shell part that can be telescopically moved on the skin of the aerodynamic body; two such aerodynamic bodies, between which a gap bridge-over device of this type is arranged, as well as an aerodynamic body in combination with a component of the main wing or the fuselage of the aircraft, between which a gap bridge-over device of this type is arranged.

According to the invention, it is proposed to provide, in particular, an aerodynamic body that can be adjusted relative to the main wing of an aircraft by means of an adjusting device, wherein a gap between the aerodynamic body and another aerodynamic body or a component of the fuselage or the main wing is formed on one lateral end and said gap is variable due to the adjustability of the aerodynamic body, and wherein the aerodynamic body features a gap bridge-over device with a shell part that extends along the gap and overlaps the outer shell of the aerodynamic body in the wingspread direction on the front side thereof in such a way that the shell part can be telescopically moved relative to this aerodynamic body in the wingspread direction. Since the shell part overlaps the skin of the aerodynamic body, a favorable design of the wing profile is achieved in the different states of adjustment of the aerodynamic body. The guidance of the shell part during its movement relative to the skin can be realized in the form of a cooperation between the shell part and the skin with an at least sectional positive fit or by means of a coupling device that couples the gap bridge-over device to the aerodynamic body.

The shell part may be positioned outside or inside the skin of the aerodynamic body.

A sealing device of a material that is elastic in the wingspread direction of the aerodynamic body may generally be arranged on the gap bridge-over device. In this case, the sealing device may be arranged on the side of the gap bridge-over device that lies opposite of the side with the overlapping region that faces the overlapping region. With respect to the coupling rib on the shell part, the sealing device may be alternatively or additionally arranged on the side that is positioned near the overlapping region. In these instances, the sealing device may be installed or arranged, in particular, on the outer edges of the shell part.

The gap bridge-over device may feature a coupling rib that is connected to the shell part and a coupling device for coupling the coupling rib to a structural component of the aerodynamic body.

In order to couple the coupling rib to one of the aerodynamic bodies, the coupling device may feature at least two connecting rods that are arranged behind one another in the chord direction and respectively provided with two articulations that couple the connecting rods to the aerodynamic body and to the coupling rib. The articulations of the connecting rods may be realized, in particular, in such a way that the coupling rib carries out a movement to be described three-dimensionally relative to the aerodynamic body.

The coupling device may also feature at least one connecting part that extends transverse to the chord direction, wherein said connecting part is coupled to the coupling rib by means of an articulated connection and can be elongated in its longitudinal direction in order to displace the shell part in the wingspread direction, wherein the coupling rib features a connection for being coupled to a second coupling device on the opposite side of the coupling rib. The length of the connecting part changes, in particular, due to a tensile force exerted by the first coupling device during the adjustment of the aerodynamic body.

The coupling device may alternatively or additionally feature a pressing device between a supporting component of the aerodynamic body and the coupling rib such that the pressing device presses the gap bridge-over device outward and away from the interior of the aerodynamic body. In this case, the pressing device may feature a telescopic rod that is prestressed in the direction toward the outer side of the aerodynamic body.

The gap bridge-over device may feature, in particular, the aforementioned coupling device with connecting rods that are coupled to the coupling rib in an articulated fashion on a first side and allow a longitudinal displacement along the skin of the aerodynamic body on its second side that lies opposite of the first side. A coupling device that features the connecting part of variable length or a coupling device that features the pressing device may be provided on the second side. In the latter instance, the first coupling device can also be eliminated. If a coupling device with a connecting part of variable length is provided on the second side, the first coupling device consists of an articulated connection between the first aerodynamic body and the coupling rib.

According to the invention, an airfoil for an aircraft with a main wing and a plurality of aerodynamic bodies that are arranged adjacent to one another transverse to the chord direction and can be adjusted relative to the main wing by means of an adjusting device is furthermore provided, wherein a gap is formed between the facing ends of the outer shell of the aerodynamic bodies and said gap is variable due to the adjustability thereof, and wherein a gap bridge-over device according to the invention is arranged between the aerodynamic bodies.

The gap bridge-over device may feature:
the shell part that at least sectionally extends along the contour of the outer shells of the aerodynamic bodies on the gap,
the coupling rib connected to the shell part,
a first coupling device for coupling the coupling rib to a first of the aerodynamic bodies in an articulated fashion, and
a second coupling device for coupling the coupling rib to a second aerodynamic body positioned adjacent to the first aerodynamic body in an articulated fashion.

In this case, the first coupling device may be formed by two connecting rod links that are arranged adjacent to one another in the wingspread direction and the second coupling device may allow a movement of the shell part relative to the aerodynamic body with a translatory component. For this purpose, the second coupling device may be formed by the connecting part that can be elongated in the wingspread direction and is guided in its longitudinal direction on the second aerodynamic body. The second coupling device may alternatively feature a pressing device between a supporting component of the second aerodynamic body and the coupling rib such that the pressing device presses the gap bridge-over device outward and away from the interior of the second aerodynamic body.

In the inventive airfoil, a gap bridge-over device with a coupling device may be respectively arranged on the first aerodynamic body and the second aerodynamic body such that it can be telescopically moved thereon, wherein said coupling device features a pressing device between a supporting component of the second aerodynamic body and the coupling rib.

The invention furthermore proposes an airfoil for an aircraft that features a main wing and an aerodynamic body with an aerodynamically active profile that can be adjusted relative to the main wing by means of an adjusting device and is arranged adjacent to a component of the fuselage or the main wing transverse to the chord direction, wherein a gap is formed between one end of the outer shell of the aerodynamic body and the component of the fuselage or the main wing and said gap is variable due to the adjustability of the aerodynamic body, and wherein said airfoil features a gap bridge-over device (1) according to one exemplary embodiments of the invention.

In this case, the gap bridge-over device may feature:
the shell part that at least sectionally extends along the contour of the outer shells of the aerodynamic bodies on the gap,
the coupling rib connected to the shell part,
a first coupling device for coupling the coupling rib to one of the aerodynamic bodies in an articulated fashion, and
a second coupling device for coupling the coupling rib to the component in an articulated fashion.

The first or second coupling device may be formed by two connecting rod links that are arranged adjacent to one another in the wingspread direction.

The first or second coupling device may furthermore be formed by the connecting part that can be elongated in the wingspread direction and is guided in its longitudinal direction on the second aerodynamic body or on the component.

In the arrangement of an aerodynamic body on a component of the fuselage or the main wing, a gap bridge-over device with a coupling device furthermore may be respectively arranged on the first aerodynamic body and the component such that it can be telescopically moved thereon, wherein said coupling device features a pressing device between a supporting component of the second aerodynamic body and the coupling rib.

The second coupling device may feature a pressing device between a supporting component of the component or the aerodynamic body and a coupling rib such that the pressing device presses the gap bridge-over device outward and away from the interior of the aerodynamic body or the component.

The invention furthermore proposes an aircraft with an airfoil according to one of the above-described embodiments.

The term wingspread direction of the aerodynamic bodies refers, in particular, to the connecting line between all centers of gravity of the cross-sectional surfaces of the respective aerodynamic body, wherein the cross-sectional surfaces may be chosen, in particular, such that they extend along the longitudinal axis of the aircraft when the respective aerodynamic body is in the retracted position.

The inventive aircraft makes it possible to attain essentially the same advantages as those described above in connection with the inventive arrangements.

BRIEF DESCRIPTION OF THE DRAWINGS

Exemplary embodiments of the invention are described below with reference to the attached figures, in which:

FIG. 5 shows the combination of two aerodynamic bodies with a sealing device and a gap bridge-over device in the form of a non-sectioned representation that is viewed obliquely from the top, wherein the aerodynamic bodies are illustrated in an extended state;

FIG. 6 shows a schematic semi-sectioned rear view of the aerodynamic bodies in the extended state according to FIG. 5, wherein the viewing direction approximately extends in the chord direction;

FIG. 7 shows the illustration according to FIG. 5, wherein the aerodynamic bodies are in a retracted state;

FIG. 8 shows the illustration according to FIG. 6, wherein the aerodynamic bodies are in an extended state;

FIG. 16 shows a perspective representation of another exemplary embodiment of an aerodynamic body or a flap intended for being arranged on a (not-shown) structural component that is stationary referred to the flap;

FIG. 17 shows the aerodynamic body according to FIG. 16 in the form of a partially sectioned representation viewed from a different perspective.

DETAILED DESCRIPTION OF THE INVENTION

Figure 1:
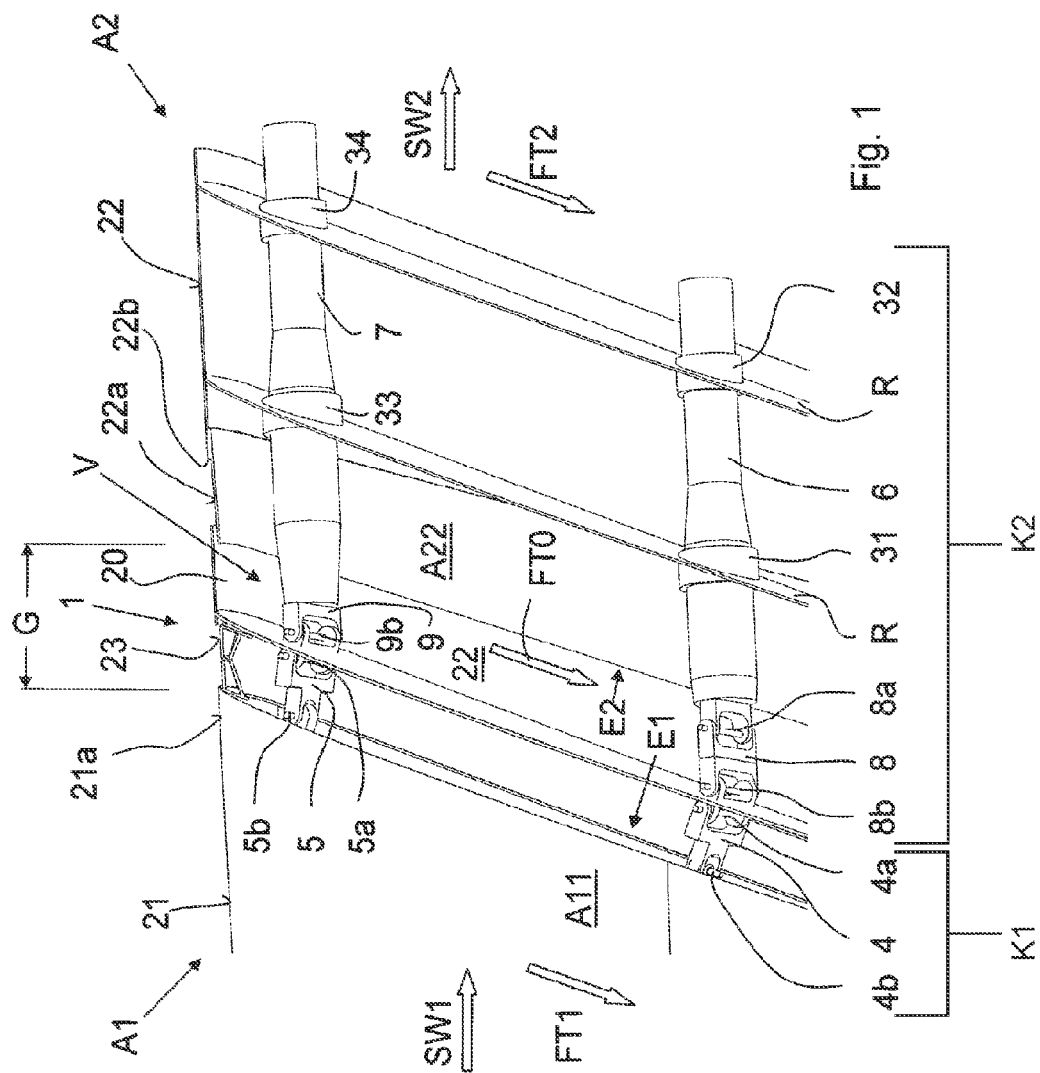
FIG. 1 shows a schematic perspective representation of two aerodynamic bodies that form part of an airfoil featuring the inventive gap bridge-over device, wherein this figure shows the aerodynamic bodies, a sealing device and the gap bridge-over device in the form of a partially sectioned representation, in which the skin is not illustrated.

In the following description and in the figures, parts or components with similar functions are in part identified by the same reference symbols.

According to one exemplary embodiment of the invention, an airfoil for an aircraft with a main wing and a plurality of aerodynamic bodies A1, A2 with an aerodynamically active profile that can be respectively adjusted relative to the main wing and are adjacently arranged transverse to the chord direction S1 are provided, wherein said aerodynamic bodies are adjustable and held on an adjusting device with a device for guiding the main wing. A gap S is formed between the facing ends of the outer shell of the aerodynamic bodies A1, A2, wherein the size and the shape of said gap depend on the state of adjustment of the aerodynamic bodies A1, A2 on the main wing and are variable in this respect. The aerodynamic bodies A1, A2 feature a gap bridge-over device 1 for at least partially bridging over or covering the gap S aerodynamically.

In another exemplary embodiment of the invention, an airfoil arranged on the fuselage of an aircraft features a main wing and an aerodynamic body with an aerodynamically active profile that can be adjusted relative to the main wing and is arranged adjacent to a component of the fuselage or the main wing transverse to the chord direction S1. The aerodynamic body is arranged on the main wing such that it can be adjusted by means of an adjusting device as in the previously described exemplary embodiment and basically has the same design and the same function as the aerodynamic bodies of the aforementioned exemplary embodiment. The aerodynamic body is guided on the main wing by means of an adjusting device with a guiding device such that it can be adjusted relative to or on the main wing and/or the component of the fuselage or the main wing. The component of the fuselage may, for example, be a component of the connecting region of the fuselage that serves for mounting the main wing. In this case, the component of the main wing may be a part of the wing end region or the wingtip. A gap S is formed between one end of the outer shell of the aerodynamic body and the component of the fuselage or main wing, wherein said gap is variable due to the adjustability of the aerodynamic body, and wherein the size and the shape of the gap depend on the state of adjustment of the aerodynamic body and are variable in this respect. The aerodynamic body features a gap bridge-over device for at least partially bridging over or covering the gap S aerodynamically.

The inventive gap bridge-over device is designed for bridging over and aerodynamically influencing the flow on a gap formed between two adjustable aerodynamic bodies A1, A2 of the aforementioned type and/or between an adjustable aerodynamic body and an aircraft frame ("airframe"). The gap between two aerodynamic bodies A1, A2 or between an aerodynamic body and an aforementioned component respectively extends transverse to the wingspread direction SW1, SW2 of the respective aerodynamic body A1, A2.

The illustration in FIG. 1 refers to the embodiment of the invention with a plurality of aerodynamic bodies A1, A2 that can be adjusted relative to the main wing and are arranged adjacent to one another transverse to the chord direction S1, wherein said aerodynamic bodies are coupled to the main wing by means of an adjusting device and/or guiding device such that they can be adjusted between different states of adjustment. FIG. 1 shows a detail of an embodiment of a combination of two aerodynamic bodies A1, A2 that form part of a (not-shown) airfoil and can be adjusted relative to the main wing or wing of the overall airfoil. The aerodynamic bodies A1, A2 respectively feature a skin 21 and 22 with an aerodynamically active profile, by means of which the aerodynamic bodies A1, A2 form part of a variable overall aerodynamic profile of the airfoil. In the exemplary embodiment shown, the airfoil forms part of a winged aircraft, but generally may also form part of any aircraft. In the exemplary embodiment illustrated in FIG. 1, the aerodynamic bodies A1, A2 are respectively realized in the form of a first landing flap A1 and a second landing flap A2 that are, however, still referred to as aerodynamic bodies below.

The aerodynamic bodies A1, A2 with the wingspread directions SW1 and SW2 are arranged in such a way that a gap G extending transverse to the wingspread directions SW1, SW2 is formed between the aerodynamic bodies A1, A2 at least in certain ranges of the states of adjustment, wherein said gap is positioned between the facing ends E1 and E2 or front sides of the aerodynamic bodies A1, A2. On these facing front sides, the aerodynamic bodies A1, A2 have a similar cross-sectional contour at least on their upper side or their lower side, i.e., cross-sectional contours that do not significantly deviate from one another.

The adjusting device for adjusting the aerodynamic bodies A1, A2 may be realized with a hinge ("dropped hinge") or a guideway. The angle of adjustment of the aerodynamic bodies A1, A2 may lie in a range, e.g., between zero degrees (fully retracted) and 40 degrees (fully extended). The adjustment of the aerodynamic bodies A1, A2 is realized by means of a not-shown adjusting device that may be designed, in particular, such that the respective aerodynamic bodies A1, A2 are equidirectionally pivoted or moved upward or downward from an initial state.

The airfoil and the aerodynamic bodies A1, A2 may be designed, in particular, such that the wingspread directions SW1, SW2 of the aerodynamic bodies A1, A2 extend in the same direction when the aerodynamic bodies A1, A2 are in their retracted position. In this exemplary embodiment, the wingspread directions of the aerodynamic bodies may furthermore extend in the same direction or in different directions relative to one another in the states of extension. In other applications, the wingspread directions change relative to one another when the aerodynamic bodies are equidirectionally retracted or extended. In these instances, in particular, the size and the shape of the gap G change when changing the states of adjustment, i.e., the states of retraction or extension of the aerodynamic bodies. In this case, the facing lateral surfaces or front sides of the aerodynamic bodies A1, A2 can also be moved relative to one another, as well as toward and away from one another. The aerodynamic bodies A1, A2 may furthermore be arranged on the main wing in such a way that the facing lateral surfaces of the aerodynamic bodies are tilted or turned relative to one another. The relative movement of the aerodynamic bodies A1, A2 during their adjustment may have a translatory and/or rotatory component.

The aerodynamic bodies A1, A2 may be constructed in different ways e.g., in the form of a rib-type construction and/or feature a foam layer and/or a honeycomb layer. In the embodiment illustrated in FIG. 1, the aerodynamic bodies A1, A2 are realized in the form of a rib-type construction. The sectionally illustrated second aerodynamic body A2 according to FIG. 1 is realized with two reinforcing ribs or ribs R. It would also be possible to provide, e.g., a core layer of foam or honeycombs or the like alternatively or additionally to the ribs R. These ribs R are clad with a skin that defines the aerodynamic outer profile of the flap 2 such that a lightweight hollow body is obtained.

The first aerodynamic body A1 features an outer section A11 that faces the other aerodynamic body A2 and is provided with a skin 21a. The second aerodynamic body A2 also features an outer section A22 that faces the first aerodynamic body A1 and is provided with a skin 22a.

The gap bridge-over device 1 is formed by a shell part 2 and a coupling rib 3 that is connected to the shell part 2 and extends along the inner side, i.e., the side that is directed toward the interior or toward the chords of the aerodynamic bodies A1, A2. The shape of the skin 20 of the gap bridge-over device 1 generally is similar to the shape of the skins 21a, 22a of the outer sections A11 and A22 of the aerodynamic bodies A1 and A2 such that the skins of the combination of the adjacently positioned aerodynamic bodies and the gap bridge-over device 1 jointly form a largely uniform aerodynamic profile. In one exemplary embodiment, this largely uniform aerodynamic profile is largely realized in all states of adjustment of the aerodynamic bodies A1, A2 on the main wing.

The coupling rib 3 itself may be realized in different ways. In this case, the coupling rib 3 may be realized, e.g., in the form of a continuous rib that adjoins the shell part 20 along the chord direction FT0 as illustrated in FIG. 1 or in the form of one or more reinforcing fittings.

The shell part 2 and the coupling rib 3 may form an integral or one-piece component, particularly a component that is manufactured in one piece. The gap bridge-over device 1 and, in particular, the shell part 2 and/or the coupling rib 3 are manufactured of a suitable material for the respective application, e.g., of light metal or a composite fiber material. The shell part 2 may be realized, in particular, in the form of a strip-shaped shell component as illustrated in the embodiment according to FIG. 1. The longitudinal direction of the shell part 2 extends transverse to the wingspread directions SW1, SW2 of the aerodynamic bodies A1, A2 and may, in particular, extend in the chord direction of one of the aerodynamic bodies A1, A2. The coupling rib 3 may extend centrally along the inner side. Alternatively, the coupling rib 3 may also extend along one of the edges of the shell part 20 such that the coupling rib 20 forms a cap-like termination of the gap bridge-over device 1 viewed in one of the wingspread directions SW1, SW2.

Two or more than two coupling ribs 3 may also be connected to one respective shell part 20. In this case, it would be possible, in particular, to respectively arrange one coupling rib 20 or a plurality of coupling ribs along the edges of the shell part 20 that extend in the longitudinal direction thereof.

In the embodiment of the gap bridge-over device 1 that is illustrated in FIG. 1, the shell part 20 has a profiled shape that is closed in the circumferential direction extending in the chord direction FT0 of the gap bridge-over device 1. However, the shell part 20 does not necessarily have to extend over the entire profile depth of the respective aerodynamic [text missing]. Depending on the respective application, the end cap 12 also may [text missing] only in certain sections viewed in the direction of the profile depth. This can preferably be realized in sections, in which the size and the shape of a variable gap G change significantly during an adjustment of the respective aerodynamic body. The shell part 20 may also cooperate or be combined with conventional gap seals in regions, in which only slight changes occur.

The skin 20 of the gap bridge-over device 1 is preferably realized in the form of a continuous skin. However, this skin may also feature openings that serve, in particular, for achieving advantageous aerodynamic effects.

The aerodynamic bodies A1, A2 and the gap bridge-over device 1 may be realized, in particular, such that one or both of the aerodynamic bodies A1, A2 overlap the main wing at least within a certain range of states of adjustment. The arrangement of the aerodynamic bodies A1, A2 and the gap bridge-over device 1 may be chosen, in particular, such that the skin 20 of the gap bridge-over device 1 overlaps the skins of the aerodynamic bodies A1, A2 over their entire adjusting range.

In this case, the overlap may be realized such that the shell part 20 is positioned inside or outside the end section A11, A22 of the respective aerodynamic body A1, A2. In one embodiment of the invention, in which the shell part is positioned outside the respective end section A11, A22 in such an overlapping region, the gap bridge-over device 1 is open on the side or both of its sides that point in the wingspread direction SW1, SW2 of the aerodynamic bodies A1, A2 such that the shell part 20 of the gap bridge-over device 1 surrounds the skins 21, 22 of the aerodynamic bodies A1 and A2 and the skin 21a, 22a of the end section A11, A22 of the respective aerodynamic body A1, A2 can be telescopically retracted into and extended from the shell part 20 when the aerodynamic bodies A1, A2 move relative to one another during their adjustment, if applicable, in corresponding ranges of the states of adjustment. In another embodiment of the invention, the shell part 20 of the gap bridge-over device 1 is positioned within the skins 21a, 22a or within one of the skins 21a, 22a of the end regions of the aerodynamic bodies A1 and A2 when the shell part 20 and the skins 21, 22 overlap, if applicable, in corresponding ranges of the states of adjustment, such that the shell part 20 can be telescopically retracted into and extended from the skin 21a, 22a of the end section A11, A22 of the respective aerodynamic body A1, A2 when the aerodynamic bodies A1, A2 move relative to one another during their adjustment.

The shell part 20 and/or the end E1, E2 of the respective aerodynamic body A1, A2 may also be realized in such a way that the shell part 20 cannot overlap the skin of an aerodynamic body A1, A2 and the gap bridge-over device 1 cannot be retracted into the skin 21, 22 of one or both of the skins 21, 22 or vice versa.

On overlapping regions, on which the shell part 20 surrounds a skin or both skins 21a, 22a of the outer sections A11 and A22, the outer sections A11 and A22 or one of the outer sections may be offset inward, i.e., toward the chord of the respective body A1 or A2. The transition from the respective outer section A11 or A22 to the section that is positioned farther from the gap bridge-over device 1 may be realized in the form of a step 21b, 22b or a ramp-shaped section. Due to this measure, the skin 20 of the shell part 2 can, viewed from the respective chord, be arranged outside the skins 21a, 22a of the respective outer sections A11 and A22. In this case, it would be possible that the inner side of the skin 20 of the gap bridge-over device 1 adjoins the outer surfaces of the skins 21a, 22a of the respective outer sections A11 and A22 and slides thereon during an adjustment of the aerodynamic bodies A1, A2.

In another exemplary embodiment, an overlapping region is provided between the skin 21a of the outer section A11 of the first aerodynamic body A1 and the skin 20 of the gap bridge-over device 1 and an overlapping region is provided between the skin 22a of the outer section A22 of the second aerodynamic body A2 and the skin 20 of the gap bridge-over device 1. In another embodiment, the skin 20 of the gap bridge-over device 1 may, viewed from the chords of the aerodynamic bodies A1, A2, be positioned therein. In another embodiment, the skin 20 of the gap bridge-over device 1 may on one side be positioned within the skin of an aerodynamic body, i.e., closer in the direction toward the chords of the aerodynamic bodies A1, A2, and on the other side positioned outside the skin of the other aerodynamic body.

In another exemplary embodiment, in which the shell part 20 of the gap bridge-over device 1 situated between the aerodynamic bodies A1, A2 is positioned outside the outer shells 21a, 22a of the facing outer end sections A11, A22 of the aerodynamic bodies A1, A2, the aerodynamic bodies A1, A2 may be realized in the form of laterally open hollow profiles such that the gap bridge-over device 1 covers the respective facing ends E1 and E2 of the aerodynamic bodies A1, A2 and may even close said ends if the gap bridge-over device 1 is designed accordingly. With respect to its shape, in particular, the shell part 20 of the gap bridge-over device 1 is adapted to the shell parts 21a, 22a of the respective aerodynamic bodies A1 and A2 with slight play, i.e., the inner contour surface of the shell part 20 is designed similar or approximately identical to the outer contour surfaces of the skins 21a, 22a in the embodiment shown.

In another embodiment, the shell part 20 of the gap bridge-over device 1 may be positioned between the skins 21, 22 of the aerodynamic bodies A1, A2 such that a (not-shown) intermediate gap is formed between the ends of the skins 21, 22 of the aerodynamic bodies A1, A2 that are directed in the wingspread direction SW1, SW2 and the shell part 20 of the gap bridge-over device 1. Such an intermediate gap may also be formed between the shell part 20 and only one of the skins 21a or 22a. The aforementioned intermediate gaps also may only be formed in certain ranges of the states of adjustment of the aerodynamic bodies A1, A2. In an arrangement of the aerodynamic bodies A1, A2 on the main wing, in which the gap G between the skins 21, 22 of the aerodynamic bodies A1, A2 changes during the adjustment thereof, the intermediate gaps consequently also change.

Particularly in an embodiment of the invention, in which at least one intermediate gap is formed, a (not-shown) elastic band or sealing device may be arranged on the end of one of the aerodynamic bodies that points in the wingspread direction or on the ends of both aerodynamic bodies A1, A2, wherein said elastic band or sealing device is realized and arranged, in particular, such that the shell part 20 of the gap bridge-over device 1 adjoins the band or the sealing device in at least one adjusting range of the aerodynamic bodies A1, A2 such that the intermediate gap is bridged over by the elastic band or the sealing device at least in the aforementioned adjusting range. In this case, the elastic band is realized in such a way that it is elastic in the wingspread direction SW1, SW2 during its compression due to the relative movement of the respective aerodynamic body and the skin 20 of the gap bridge-over device 1 and returns to its original shape when the respective aerodynamic body and the skin 20 of the gap bridge-over device 1 move apart from one another. In one embodiment of the invention, the skin 20 of the gap bridge-over device 1 adjoins the band or the sealing device over the entire adjusting range of the aerodynamic bodies A1, A2.

The elastic band or the sealing device may be arranged on the skin of the respective aerodynamic body or on a carrier part of the respective aerodynamic body such as, e.g., a rib thereof and have the shape, e.g., of a sealing profile. In this case, such a band or such a sealing device may be provided, in particular, on the side of the skin 20 of the gap bridge-over device 1 that does not overlap the adjacent skin of the respective aerodynamic body. However, such an elastic band or such a sealing device may also be provided if an overlapping region 23, 24 is formed in an adjusting range of the aerodynamic bodies as well. The aforementioned elastic band may be additionally or alternatively arranged on the gap bridge-over device 1, particularly on the shell part or the skin 20 of the gap bridge-over device 1.

Figure 2:
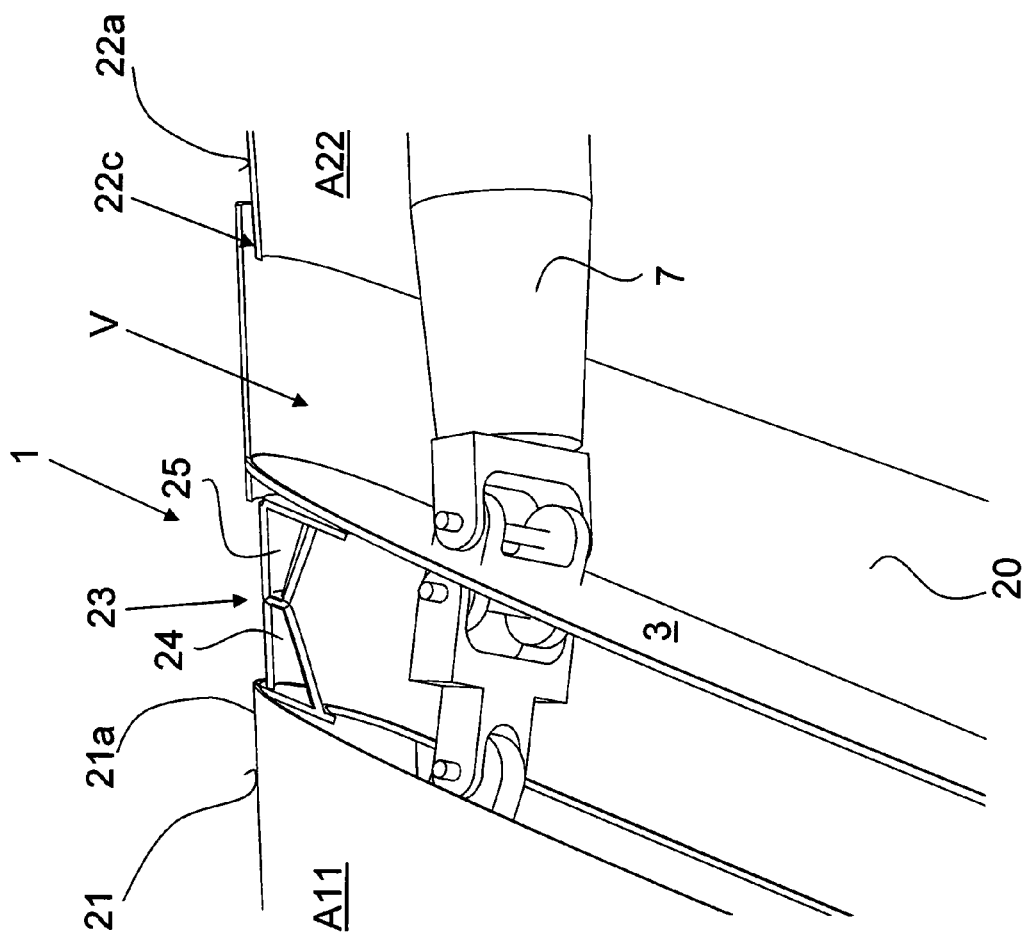
FIG. 2 shows a detail of a region of FIG. 1 that is illustrated in the same fashion as in this figure.

FIG. 1 shows a schematic perspective representation of two aerodynamic bodies A1, A2 that form part of an airfoil provided with the inventive gap bridge-over device 1. In order to provide a better overview, the aerodynamic bodies A1, A2, as well as the gap bridge-over device 1, are respectively illustrated in the form of a partially sectioned top view, in which part of the skin is not shown. The first aerodynamic body A1 and the second aerodynamic body A2 respectively feature a skin 21 and 22 that completely surround the aerodynamic bodies in conventional applications. The embodiment illustrated in FIGS. 1 and 2 features a sealing device 23 in the form of a peripheral sealing shell or sealing cap 23a that peripherally extends along the edge of the skin 21 and is arranged on the first aerodynamic body A1, wherein said sealing device is designed in such a way that the gap bridge-over device 1 adjoins this sealing device over part of or the entire range of states of adjustment of the aerodynamic bodies A1, A2. The sealing shell has a profiled shape with an outside contour surface that is adapted or realized similar to the outside contour surface of the skin 21 of the first aerodynamic body A1 and the shell part 20 of the gap bridge-over device 1. In this case, the sealing device may feature a flange that is arranged on the sealing shell 23 and provided with a contact surface 23b that is adjoined by the coupling rib 3. This sealing device 23 may be realized in such a way that it adjoins the gap bridge-over device 1 in an airtight or largely airtight fashion. Particularly for this purpose, the sealing device 23 may be realized with the sealing shell 20 and the flange that is adjoined by the coupling rib 3 with its surface that faces the flange.

Figure 3:
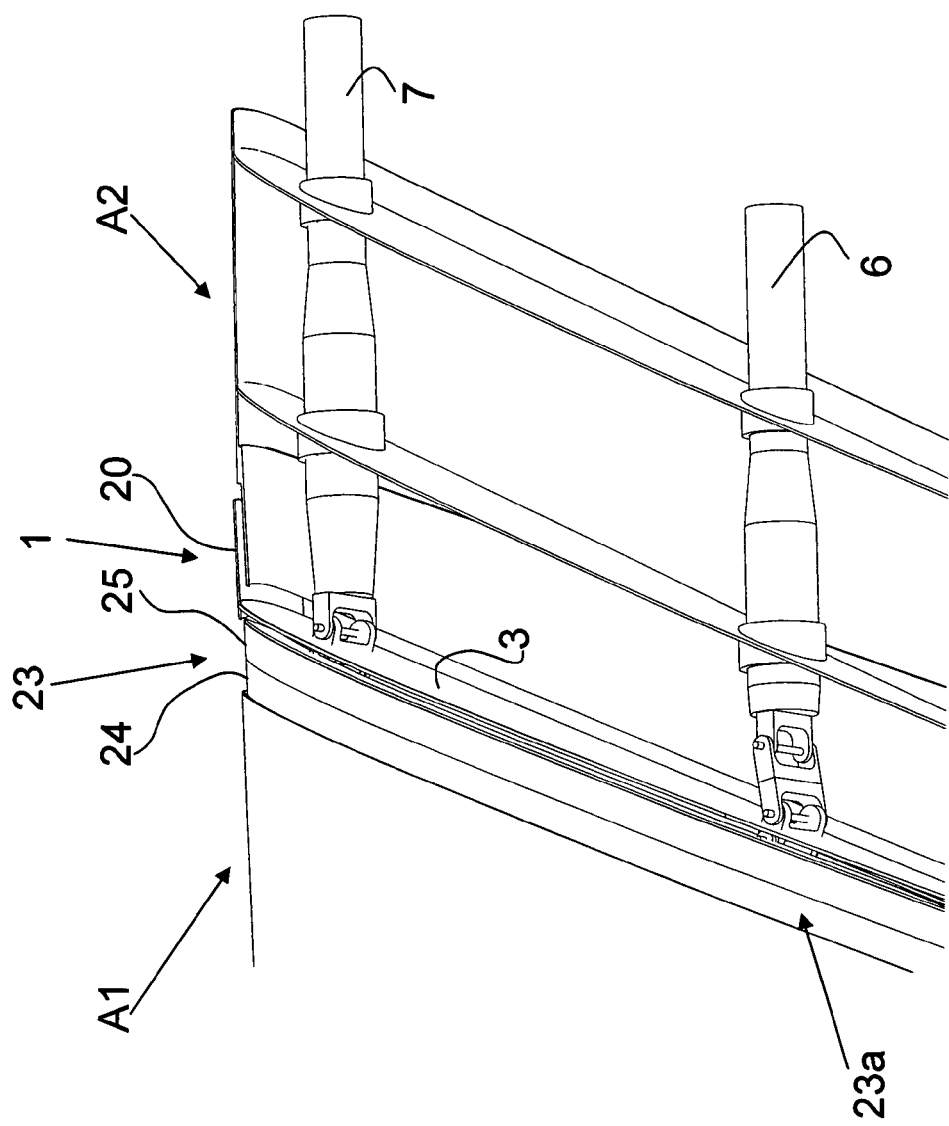
FIG. 3 shows a detail of a region of FIG. 1, in which the sealing device is not illustrated in the form of a sectioned representation and the aerodynamic bodies are in a relatively retracted position.
Figure 4:
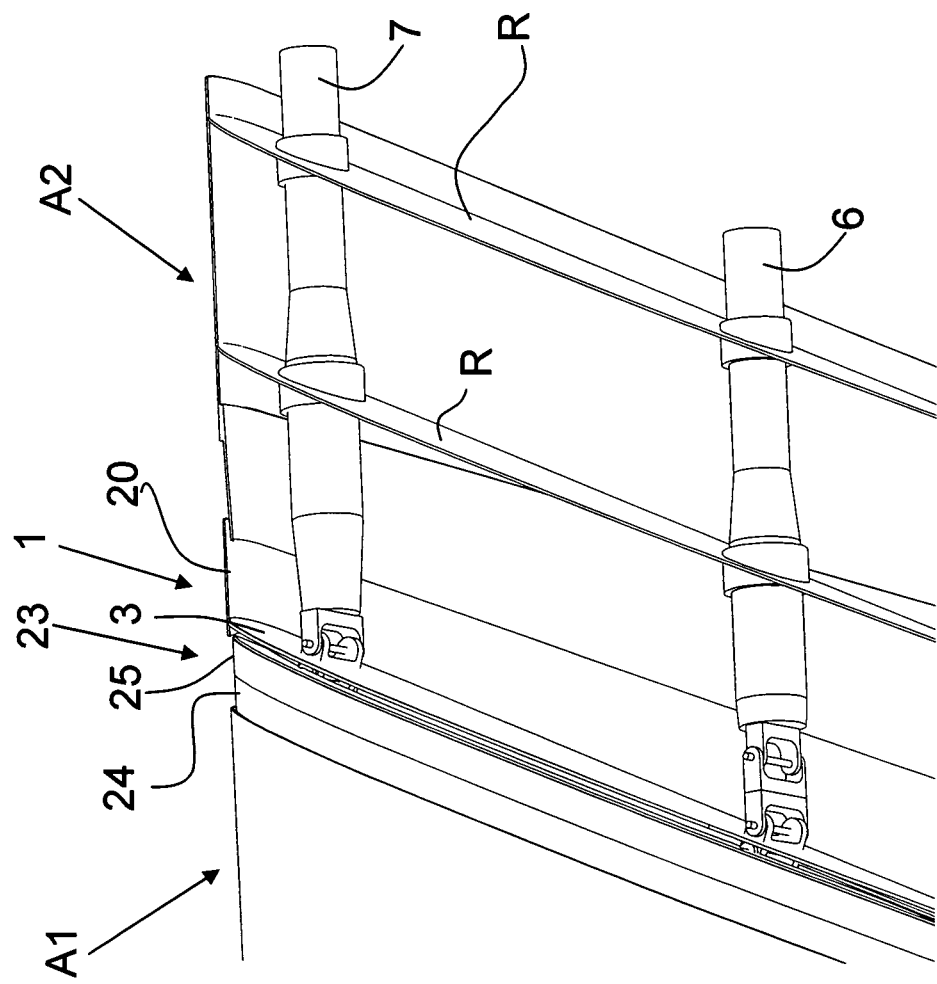
FIG. 4 shows the illustration according to FIG. 3, wherein the aerodynamic bodies are in a relatively extended position.

The sealing device 23 may also be formed by a plurality of sealing profiles that lie adjacent to one another in the wingspread direction SW1, SW2 of the respective aerodynamic body A1, A2. In the embodiment according to FIG. 3, two sealing profiles 24, 25 are provided and lie adjacent to one another in the wingspread direction SW1, SW2 of the first aerodynamic body A1. This makes it possible, e.g., to realize an adaptation to the respective application by utilizing different cross-sectional shapes of the sealing profiles 24, 25 and/or by utilizing different materials for the sealing profiles 24, 25. For example, the sealing profile 24, 25 positioned near the gap bridge-over device 1 can thusly be realized softer in the wingspread direction in order to optimize the sealing effect.

The exemplary embodiment of the invention illustrated in FIG. 1 features an overlapping region between the skin 22a of the outer section A22 of the second aerodynamic body A2 and the skin or the shell part 20 of the gap bridge-over device 1, wherein the shell part 20 is positioned outside the skin 21a of the outer section A11 of the first aerodynamic body A1.

In order to couple the gap bridge-over device 1 to the aerodynamic bodies A1, A2, the coupling rib 3 is coupled to the first aerodynamic body A1 in an articulated fashion by means of a first coupling device K1 and coupled to the second aerodynamic body A2 positioned adjacent to the first aerodynamic body A1 in an articulated fashion by means of a second coupling device K2.

According to the invention, the above-described embodiments may also be analogously realized in an arrangement of a component of the fuselage or the main wing and an aerodynamic body A1, A2 arranged adjacent to the component of the fuselage or the main wing. In this variation, a plurality of aerodynamic bodies A1, A2 with a gap bridge-over device 1 according to the inventive embodiments may also be arranged adjacent to the component of the fuselage or the main wing.

In the arrangement of a component of the fuselage or the main wing and an aerodynamic body arranged adjacent to the component, the shell part 20 may be arranged outside or inside a shell part of the component and overlap this shell part. One of the above-described embodiments of a sealing device may also be arranged on the component or the aerodynamic body positioned adjacent thereto.

The gap bridge-over device 1 particularly features:
- a shell part 20 that at least sectionally extends along the contour of the outer shell of the aerodynamic body on the gap G,
- a coupling rib 3 connected to the shell part 20,
- a first coupling device K1 for coupling the coupling rib 3 to the aerodynamic body A1 in an articulated fashion, and
- a second coupling device K2 for coupling the coupling rib 3 to the component of the fuselage or the main wing positioned adjacent to the first aerodynamic body A1 in an articulated fashion.

The inventive gap bridge-over device 1 is described below with reference to the embodiment of the airfoil with two adjacently arranged aerodynamic bodies A1, A2 according to FIG. 1 ff. that can be adjusted relative to the main wing, namely in the sense that the individual characteristics can be applied analogously to the above-described variations and embodiments of the invention:

With respect to its shape, the shell part 20 of the gap bridge-over device 1 is adapted to the shell parts 21a, 22a of the aerodynamic bodies A1 and A2 with slight play and therefore can, depending on the design of the coupling devices K1, K2, be displaced relative to one and/or the other aerodynamic body A1, A2. In the embodiment shown, the end section 22a of the skin 22 of the second aerodynamic body A2 can be telescopically moved into or out of the shell part 20. In this case, the movement of the gap bridge-over device 1 and, in particular, the shell part 20 relative to the skin 22 may have translatory components and/or rotatory components. The shell part 20 and the skin are realized in such a way that jamming thereof is prevented during the relative movements.

At least one of the coupling devices K1, K2 for coupling the coupling rib 3 to the respective aerodynamic body may feature two connecting rods 4, 5 that are arranged behind one another in the chord direction FT1, FT2 and respectively provided with two articulations 4a, 4b; 5a, 5b that couple the connecting rods 4, 5 to the aerodynamic body A1 and the coupling rib 3. In FIG. 1, the connecting rods 4, 5 are coupled to the coupling rib 3 by means of the articulations 4a, 5a and to the first aerodynamic body A1 and, in particular, its supporting structure by means of the articulations 4b, 5b. In another exemplary embodiment, the coupling rib 3 may be respectively coupled to the first and the second aerodynamic body A1, A2 by means of such connecting rods and articulations on both sides.

In the exemplary embodiment illustrated in FIG. 1, the coupling device K2 for coupling the coupling rib 3 to the second aerodynamic body A2 features two connecting parts 6, 7 that are arranged behind one another in the chord direction FT2 and extend transverse to the chord direction FT2, wherein said connecting parts are coupled to the coupling rib 3 by means of an articulated connection and can be elongated in their longitudinal direction in order to displace the shell part 20 relative to the aerodynamic body A2 in the wingspread direction SW2. In the exemplary embodiment shown, one of the connecting parts (reference symbol 7), namely the upper connecting part 9 in the plane of projection of FIG. 1 which is positioned closer to the front edge of the aerodynamic body A2, is coupled to the coupling rib 3 by means of a connecting hinge 9. The rotational axis $9b$ of the connecting hinge 9 extends transverse to the chord direction FT2 and the wingspread direction SW2 of the second aerodynamic body A2, particularly in an angular range of 45 to 90 degrees thereto. The other of the two connecting parts (reference symbol 6) is furthermore coupled to the coupling rib 3 by means of a connecting rod 8 such that such a first hinge $8a$ couples the connecting rod 8 to the connecting part 9 and a second hinge $8b$ couples the connecting rod 8 to the coupling rib 3. The rotational axes of the connecting hinges $8a$, $8b$ extend transverse to the chord direction FT2 and the wingspread direction SW2 of the second aerodynamic body A2, particularly in an angular range of 45 to 90 degrees thereto.

The coupling rib 3 may generally be coupled to the respective aerodynamic body with only one connecting part that can be elongated, wherein the connection between the connecting part and the coupling rib may be realized by means of a hinge or by means of a connecting rod or another coupling part. In the coupling between the coupling rib 3 and an aerodynamic body, it would also be possible to provide, in particular, a connecting part or coupling part that can be elongated in its longitudinal direction in combination with at least one connecting rod link of the type provided between the coupling rib 3 and the first aerodynamic body A1 in the embodiment shown. The coupling connections of the first or the second coupling device particularly feature ball-and-socket joints. These may be provided, e.g., on the articulation links for the coupling rib or for the respective aerodynamic body or alternately on the coupling rib and the respective aerodynamic body.

In another exemplary embodiment, the coupling rib 3 may be coupled to the first and to the second aerodynamic body by means of a connecting part that can be elongated in its longitudinal direction on both sides, namely also in combination with a connecting rod link.

The coupling devices generally feature an articulated connection with one or more articulation axes. In special applications, one of the two coupling devices can be eliminated. The design and the dimensions of the articulated connection in the exemplary embodiment according to FIG. 1 are chosen, in particular, such that the shell part 20 of the gap bridge-over device 1 is held at a predetermined distance from the facing edge of the respective aerodynamic body and the sealing devices are simultaneously pressed against one another with a predetermined contact pressure. The seal between the shell part 20 of the gap bridge-over device 1 and the skin of the first aerodynamic body A1 is produced in this fashion. Due to the design of the coupling device K1 with the connecting rods 4, 5, the shell part 20 of the gap bridge-over device 1 can respectively carry out movements relative to the first aerodynamic flap A1 or its edge in the gap region, as well as slight movements in the wingspread direction SW1 and in the profile depth direction FT1 without impairing the sealing effect.

Depending on the design of the coupling device and, in particular, its articulations, the shell part 20 of the gap bridge-over device 1 may furthermore carry out slight tilting movements relative to the edge of the aerodynamic body A1. The articulated connections may, in principle, also be constructed such that they allow slight movements in the profile thickness direction Z.

The shell part 20 of the gap bridge-over device 1 is, depending on the relative movement of the aerodynamic bodies, held between the skins of the aerodynamic bodies A1, A2 in a predetermined fashion with the coupling devices provided in accordance with the invention such that it covers the gap G completely or at least partially. Although a separate drive unit for the adjustment of the gap bridge-over device 1 is not required, such a drive unit may be provided in the above-described exemplary embodiments.

In order to position and guide the possibly telescopic movement of the shell part 20 or the gap bridge-over device 1 and simultaneously prevent jamming of the gap bridge-over device 1, the gap bridge-over device 1 and/or one or both coupling devices K1, K2 may be guided on the respective aerodynamic body by means of a guiding device.

In one exemplary embodiment, the guiding device may feature a receptacle, in which one of the connecting parts or both connecting parts are guided in their longitudinal direction. The receptacle may be realized, in particular, in the form of a ring that can accommodate a cylindrical section of the respective connecting part 6, 7 and allows, in particular, a longitudinal displacement of the connecting part. In an additional development of this exemplary embodiment, the ring may be arranged on one of the ribs 4 of the respective aerodynamic body. In the embodiment according to FIG. 1, two annular receptacles 31, 32 for holding and guiding the first connecting part 6 and two annular receptacles 33, 34 for holding and guiding the second connecting part 7 are provided. Due to the utilization of two annular receptacles, the respective connecting part 6, 7 is supported therein such that it can be displaced in its longitudinal direction. The displacement of the connecting part or part thereof occurs when the length of the connecting part changes, in particular, due to a tensile force being exerted upon the gap bridge-over device by the other respective aerodynamic body. If only one annular receptacle is used per connecting part, it can be additionally pivoted relative to the rib 3, in or on which the receptacle is supported. The type and the number of supports for each connecting part depend on the respective application and the design of the inventive airfoil.

The connecting parts 6, 7 may also be realized in a rod-shaped fashion and guided in guide tubes.

Figure 9:
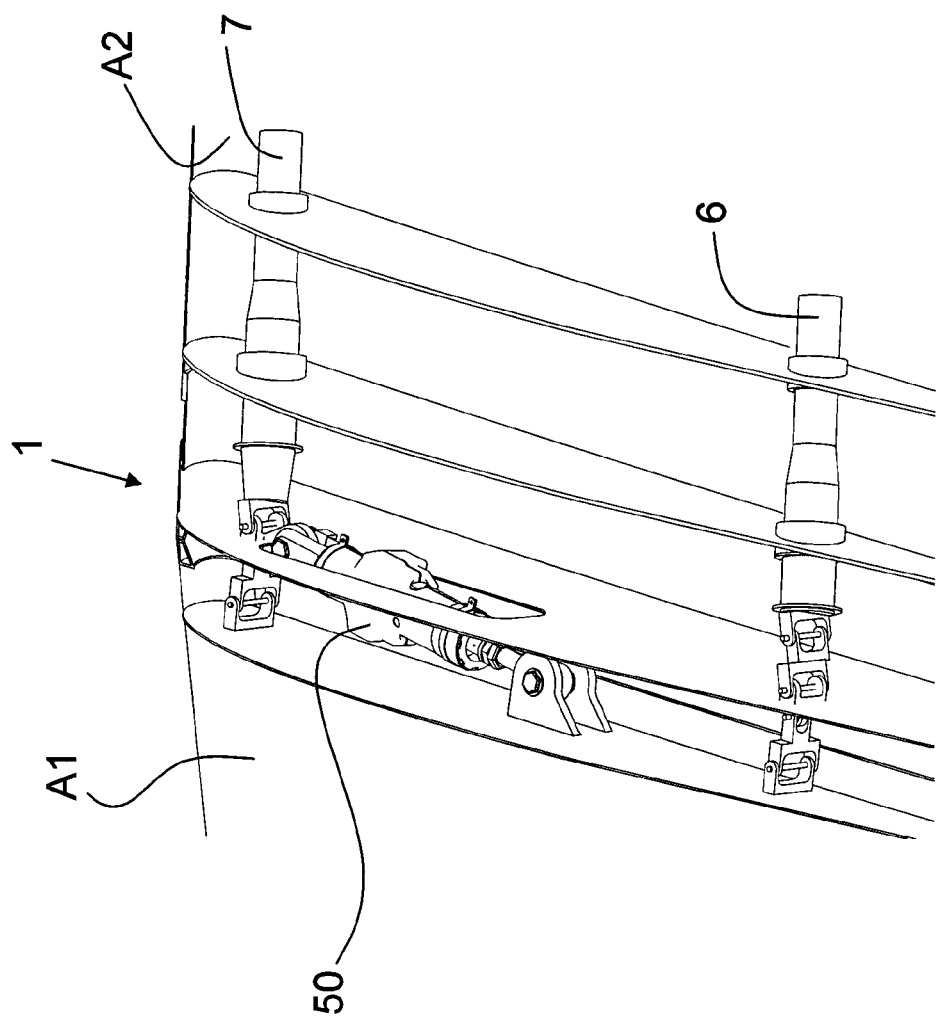
FIG. 9 shows a detail of another exemplary embodiment of the combination of two aerodynamic bodies with a gap bridge-over device and a sealing device, as well as a connecting brace that connects one aerodynamic body to the gap bridge-over device.

FIG. 9 shows a detailed view of another exemplary embodiment of the combination of two aerodynamic bodies with a gap bridge-over device and a sealing device, as well as a connecting brace 50 that connects an aerodynamic body to the gap bridge-over device. The connecting brace 50 is provided for improving the reliability of the aerodynamic bodies in case one or both of the aerodynamic bodies are detached from their respective adjusting unit, particularly due to a fracture of a supporting component. The connecting brace 50 couples the two aerodynamic bodies such that the aerodynamic body detached from its adjusting unit is held in a stable state on the main wing by the other aerodynamic body that is still attached to its adjusting unit. Such a connecting brace 50 may be provided in all of the inventive embodiments.

In the embodiment shown, the connecting brace 50 couples an aerodynamic body A1 to the coupling rib 3. Alternatively, the connecting brace 50 may also directly couple the two aerodynamic bodies A1, A2 to one another.

Figure 10:
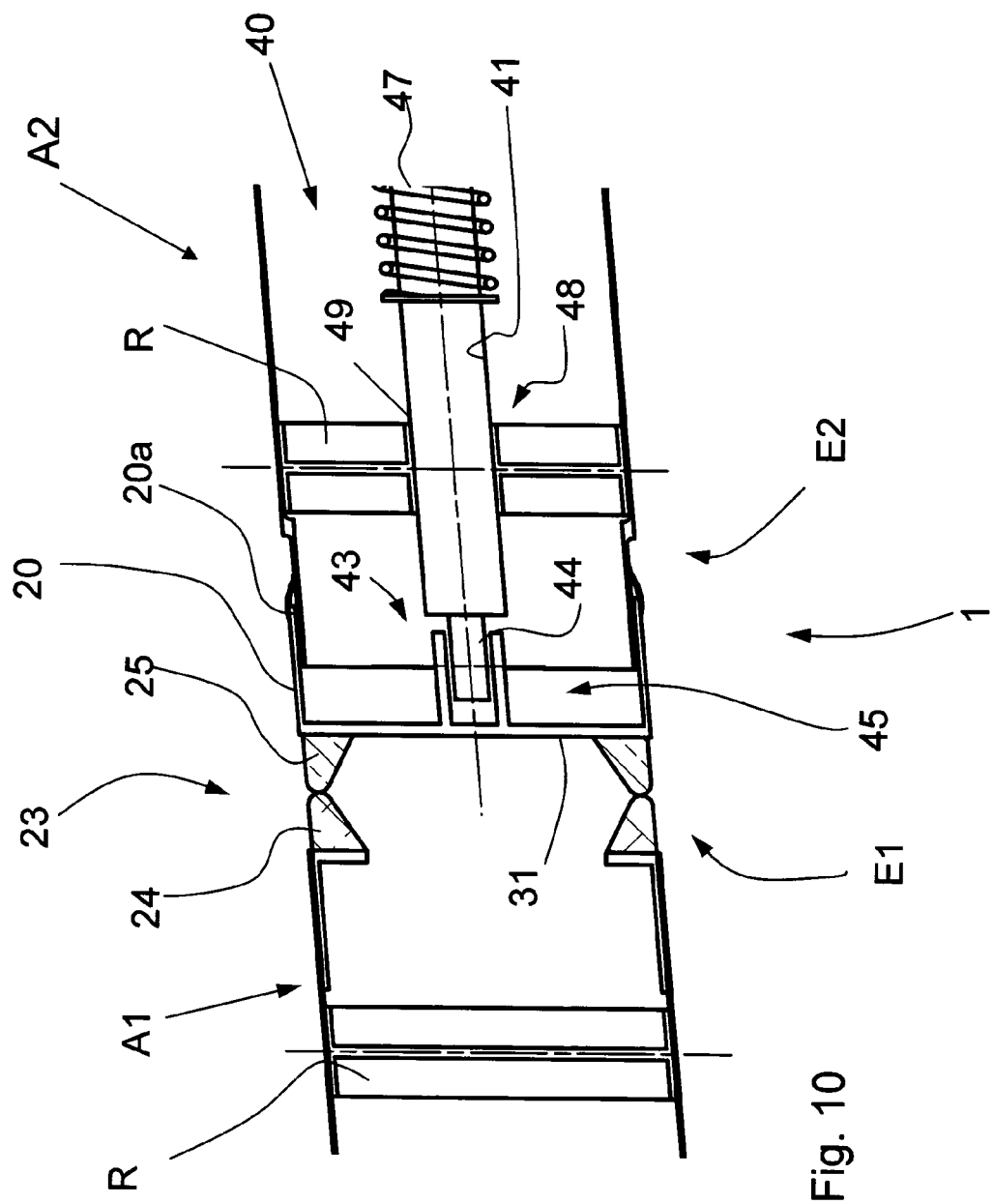
FIG. 10 shows a section through an exemplary embodiment of a combination of two aerodynamic bodies in a first position relative to one another.
Figure 11:
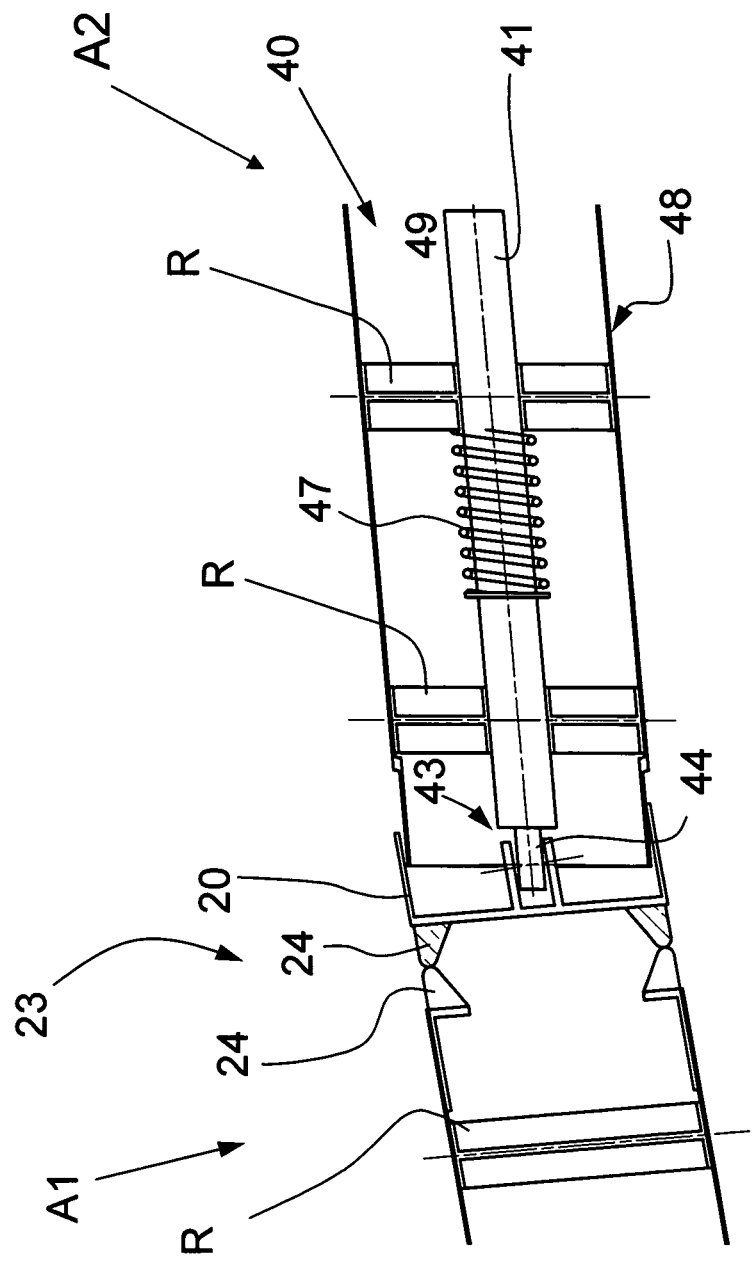
FIG. 11 shows the illustration of the exemplary embodiment of a combination of two aerodynamic bodies according to FIG. 10 in a second position relative to one another.

FIG. 10 shows a section through another exemplary embodiment of an inventive combination of two aerodynamic bodies in a first position relative to one another, wherein these two aerodynamic bodies are illustrated in a second position relative to one another in FIG. 11. The viewing direction for the aerodynamic body shown extends approximately in the direction of the profile depth. In this exemplary embodiment, a sealing device 20a in the form of a sealing profile is arranged on the end of the shell part 20 that faces the second aerodynamic body A2. The sealing element 20a is realized in a lip-like fashion in this exemplary embodiment. A comparable sealing element could also be provided in all of the inventive embodiments, wherein an inner and outer arrangement referred to the shell part 20 can be realized. The sealing device or the sealing element may circumferentially extend over the entire circumference of the shell part 20 or only sections thereof.

In the inventive embodiment, the gap bridge-over device 1 is pressed against the first aerodynamic body A1 by a second aerodynamic body A2 with the aid of a pressing device 40. In this case, the gap bridge-over device 1 may be coupled to the second aerodynamic body A2 in an articulated fashion or otherwise by means of a second coupling device K2, e.g., of the type described above with reference to the embodiment according to FIG. 1. However, it would generally also be possible that the gap bridge-over device 1 is merely pushed onto the outer section A22 of the skin 22 of the second aerodynamic body A2. Since the gap bridge-over device 1 is pressed against the first aerodynamic body A1 by means of the pressing device, a movement of the first aerodynamic body relative to the second aerodynamic body A2 causes a corresponding movement of the gap bridge-over device 1 adjoining the first aerodynamic body A1.

In another exemplary embodiment, a sealing device 23 is arranged between the gap bridge-over device 1 and the first aerodynamic body A1. The sealing device 23 may be arranged on the first aerodynamic body A1 and/or on the gap bridge-over device 1, i.e., on the respective facing ends or edges thereof. In the embodiment shown, a sealing profile 24 or sealing band is arranged on the first aerodynamic body A1 and a sealing profile 25 or sealing band is arranged on the gap bridge-over device 1.

One embodiment of the pressing device 40 features a pressure rod 41 with a bearing part 44, e.g., in the form of a pin, as well as a bearing device 45. The bearing device is arranged on the gap bridge-over device 1 and may be realized in the form of a depression or a recess suitable for accommodating or supporting the bearing part 44. The bearing part 44 may be coupled to the pressure rod, in particular, by means of an articulation. The articulation may consist of a hinge or a ball-and-socket joint.

Figure 12:
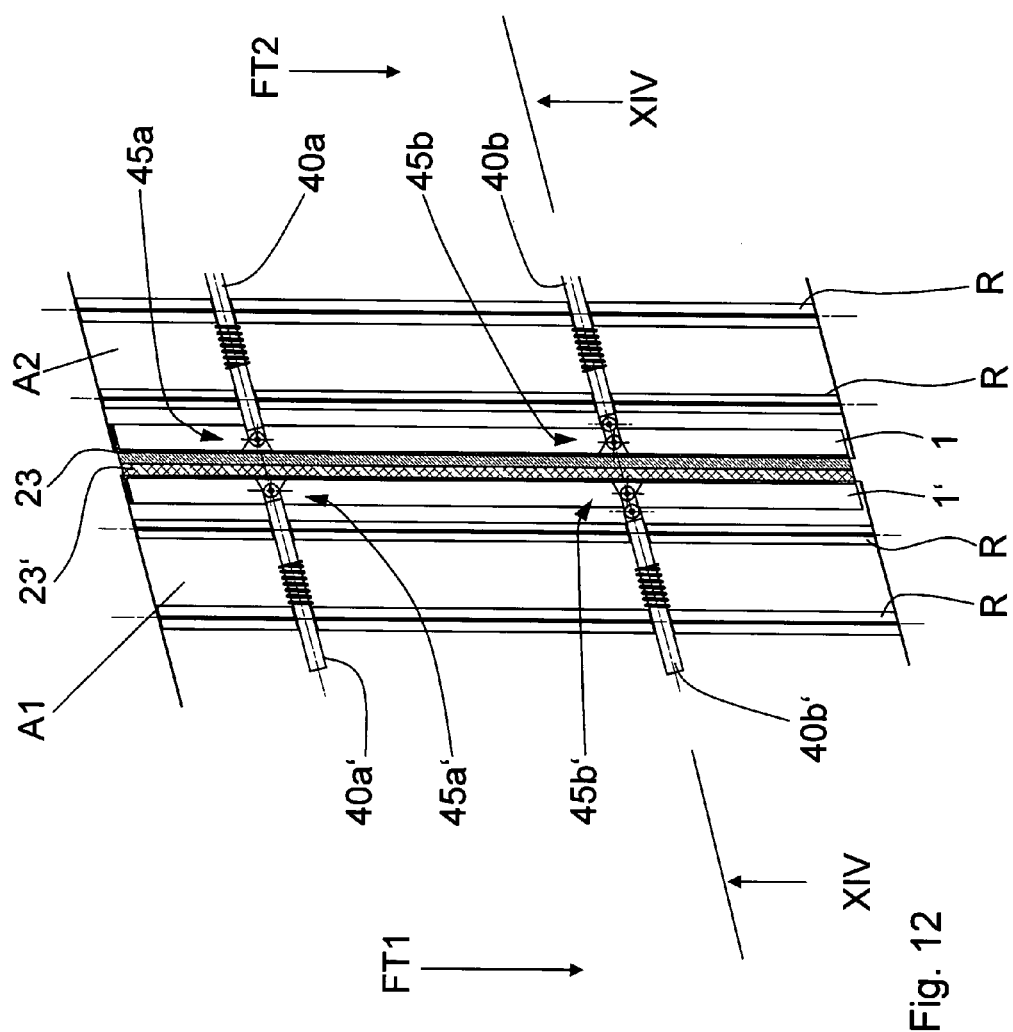
FIG. 12 shows a sectioned representation of another exemplary embodiment of a combination of two aerodynamic bodies viewed from the top, i.e., in the direction of the wing thickness.

The bearing device and the bearing part may be realized in different ways, e.g., in the form of a linear guide (FIG. 10) or in the form of a bearing arrangement that allows a pivoting movement of the pressure rod 41 relative to the gap bridge-over device 1. For this purpose, the cross section of the receptacle is larger than the cross section of the bearing part 44 in the embodiment shown such that the bearing part can pivot in the bearing device. In contrast to FIG. 11, the articulation element 42 of the thrust element 40 has another degree of freedom that is realized, e.g., by respectively utilizing a spherical plain bearing or a ball-and-socket joint or the like. This design is particularly suitable for constructions, in which the two adjacent aerodynamic bodies A1, A2 are arranged angularly relative to one another as shown in FIG. 12 and correspondingly large angular variations occur during the operation of the flaps.

The combination of bearing device and bearing part may also be realized in the form of an articulation.

In this embodiment, the gap bridge-over device 1 consequently is not coupled to the first aerodynamic body A1, but rather can be freely displaced relative thereto. Since the pressing device presses the gap bridge-over device 1 against the first aerodynamic body A1 and the gap bridge-over device 1 is pushed onto the outer section A22 of the second aerodynamic body A2, the gap bridge-over device 1 is held between the two aerodynamic bodies A1, A2.

The pressing device 40 is realized in such a way that it presses the pressure rod 41 against the gap bridge-over device 1 with a predetermined and limited force of pressure. The force of pressure can be generated by an actuator or by a prestressing device. In the embodiment illustrated in FIG. 10, the force of pressure is generated by a prestressing device in the form of a spring device that prestresses a rod element that can be telescopically moved from a base body in the direction of the gap bridge-over device 1.

Several pressing devices 40 may be arranged in the second aerodynamic body A2 adjacent to one another referred to the direction of the profile depth.

The at least one pressure rod may be guided, e.g., on the ribs 4 in the longitudinal direction thereof by means of guiding devices. In this case, the connecting device may be designed as described above with reference to the exemplary embodiment according to FIG. 1. The guiding device may feature, in particular, recesses 49 in the ribs 4 and optional guide rings positioned therein in order to accommodate the pressure rod in such a way that it can be longitudinally displaced and optionally accommodated by the guiding device such that it is rotatable about its longitudinal axis. To this end, the pressure rod may be realized in the form of a telescopic rod (FIG. 10). In this embodiment, the pressing device acts as an actuator and is part of a guiding device for guiding the gap bridge-over device 1 on the second aerodynamic body A2. The pressing devices ensure that the gap bridge-over device 1 is pressed against the front side or the end E2 of the first aerodynamic body A1 and the sealing device 23 positioned in between in all states of adjustment of the aerodynamic body, and that the variable gap S is reliably sealed. If several pressure rods 41 are spaced apart from one another in the direction of the profile depth and connected to the gap bridge-over device 1 in an articulated fashion, the displacement paths of the pressure rods 41 may be identical or different depending on the respective relative movement between the adjacent aerodynamic bodies. Due to this measure, the gap bridge-over device 1 can also be adapted to asymmetric gap shapes and uneven gap spacings on a front and rear edge region of the adjacent flaps 2, 4 in this variation.

Figure 13:
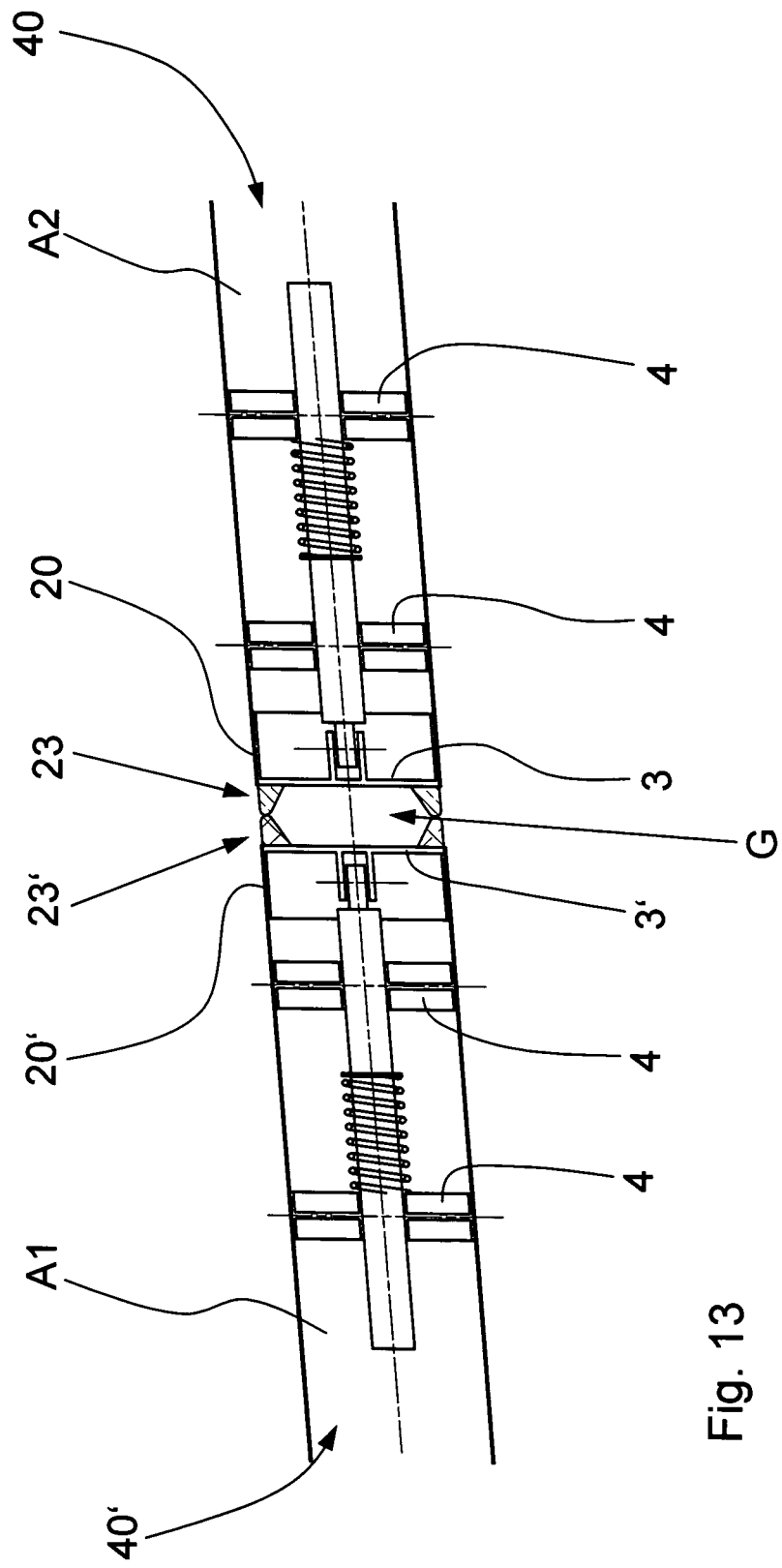
FIG. 13 shows a sectioned representation of the exemplary embodiment according to FIG. 12 viewed in the chord direction.
Figure 14:
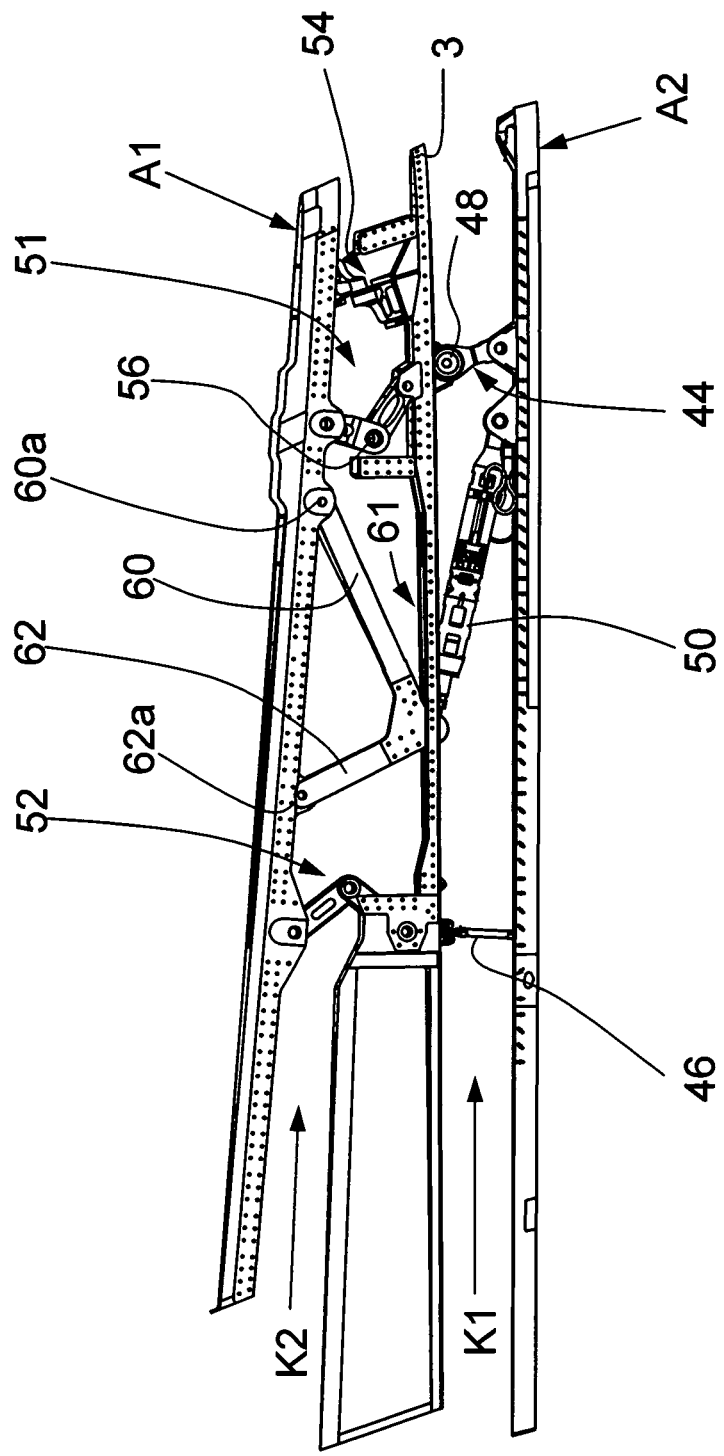
FIG. 14 shows a perspective representation of one form of realizing the exemplary embodiments according to FIGS. 1 to 10.

FIGS. 12 and 13 show another exemplary embodiment of the invention, wherein FIG. 12 shows a schematic sectioned top view of the arrangement of the aerodynamic bodies A1, A2 and FIG. 14 shows a schematic section through said aerodynamic bodies along the line of section XIV-XIV in FIG. 13. In this embodiment, each of the two adjacent aerodynamic bodies A1, A2 is equipped with a gap bridge-over device 1, 1' that can be displaced in a telescopic fashion on their front sides that lie opposite of one another. Each of the gap bridge-over devices 1, 1' is coupled to one respective pressing device 40 and 40' for pressing the respective gap bridge-over device 1 or 1' in the direction toward the adjacent aerodynamic body as described above with reference to FIGS. 10, 11. The pressing devices 40 and 40' press the respective gap bridge-over devices 1, 1' coupled thereto in the direction toward the adjacent aerodynamic body A1, A2. Sealing devices 23, 23' are optionally arranged on each of the two gap bridge-over devices 1, 1', wherein said sealing devices extend at least sectionally along the edge of the facing front surfaces of the gap bridge-over devices 1, 1' and adjoin one another due to the pressure exerted upon the gap bridge-over devices 1, 1' by the pressing devices 40 and 40'. The sealing devices 23, 23' and the pressing devices 40 and 40' may also be realized in such a way that they seal the gap. This design allows an improved mobility of the sealed components in the gap region and is particularly suitable for bridging over and sealing a very large gap G that significantly varies with respect to its shape.

This exemplary embodiment can be realized in different variations that were already described above with reference to the other exemplary embodiments. For example, it would be possible to provide several pressing devices 40 or 40' that are arranged adjacent to one another in the chord direction FT1, FT2 and coupled to the gap bridge-over devices 1, 1'. In the exemplary embodiment according to FIG. 12, two pressing devices 40a' and 40b' are arranged on the first aerodynamic body A1 and respectively coupled to the assigned gap bridge-over device 1' by means of a hinge 45a' and 45b'. Furthermore, two pressing devices 40a and 40b are also arranged on the second aerodynamic body A2 and respectively coupled to the assigned gap bridge-over device 1 by means of a hinge 45a and 45b.

Figure 15:
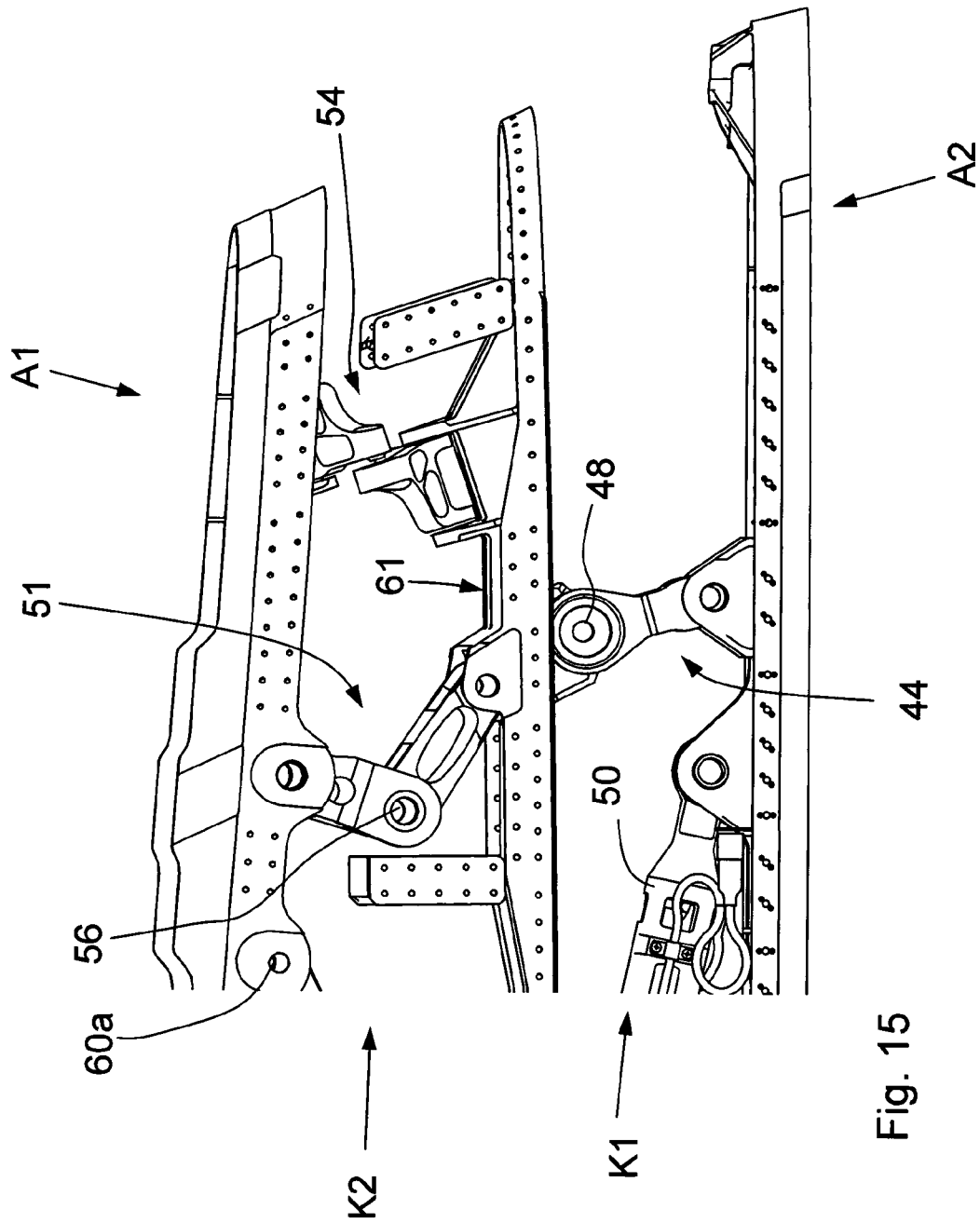
FIG. 15 shows an enlarged detail of the illustration according to FIG. 14.

FIG. 14 shows a schematic perspective top view of a fifth exemplary embodiment of the arrangement of two aerodynamic bodies, and FIG. 15 shows an enlarged and detailed perspective view of the region XVI in FIG. 14. In these two drawings, the skins or outer peripheral surfaces of the first and second aerodynamic body A1, A2, as well as the end cap 12, are not illustrated in order to provide a better overview, and only the ribs 4 on the front side of the first and the second aerodynamic body A1 and A2 are shown. Only the coupling rib 3 of the gap bridge-over device 1 is shown in the form of a rib-like skeleton body. FIGS. 14 and 15 show embodiments according to FIGS. 1 to 10 that are realized with the above-described components and functions.

The second coupling device K2 is formed by two articulated connections 44, 46 that couple a rib R to the coupling rib 3. The coupling element 44, 46 [text missing] 20 fixed on the first flap 2 and the end cap skeleton body 12d. The front or upper articulated connection in the two aforementioned drawings is realized in the form of a connecting rod link or articulated lever arrangement and coupled to the coupling rib 3 by means of a spherical plain bearing 48. The rear or lower articulated connection 46 in both drawings is realized in the shape of a rod and also coupled to the coupling rib 3 in an articulated fashion.

The first coupling device K1 is formed by a guide rod arrangement with several guide rods 50, 52, 54 that guide the gap bridge-over device 1 in several axes in the gap region between the adjacent aerodynamic bodies A1, A2 during a displacement that essentially takes place in the wingspread direction. Two guide rods 50, 52 that are realized in the form of toggle levers are arranged such that they are spaced apart from one another in the direction of the profile depth and respectively engage on the first aerodynamic body A1 with one end and on the coupling rib 3 with the other end. The articulation axes of these two toggle levers 50, 52 essentially extend in the direction of the profile thickness, wherein the coupling rib 3 is held in the direction of the profile thickness and guided in the wingspread direction by this toggle lever pair 50, 52. The third guide rod 54 that is also realized in the form of a toggle lever is arranged in the vicinity of the front edge of the first aerodynamic body A1 and engages on the first aerodynamic body A1 with one end and on a front region of the coupling rib 3 with the other end. This third toggle lever 54 in the form of a toggle link features a spherical plain bearing 56 with several degrees of freedom. The main articulation axis of this plain bearing 56, however, extends approximately in the direction of the profile depth and at a slight acute spatial angle relative thereto such that the third toggle lever 54 essentially holds the gap bridge-over device 1 in the direction of the profile depth and guides said gap bridge-over device between the adjacent aerodynamic bodies A1, A2.

The above-described intermediate connecting brace 50 that couples the first and the second aerodynamic body to one another in order to improve the safety of the arrangement of aerodynamic bodies furthermore is optionally installed in the exemplary embodiment according to FIGS. 14 and 15. One end of the intermediate connecting brace 50 is connected to the first aerodynamic body A1 in an articulated fashion and the other end is connected to a triangle that is formed by two rod bodies 62 and 62 and the base of which adjoins the front side of the shown rib body 4 of the first aerodynamic body A1. This brace extends between two termination points 60a and 62a that are spaced apart from one another in the direction of the profile depth and at which the two rod bodies 60, 62 are connected to the front side of the first aerodynamic body A1 in an articulated fashion. According to FIG. 15, the apex of the triangle protrudes through a through-opening 61 provided in the coupling rib 3. Depending on the position of displacement of the end cap 12, the apex or the coupling point of the connecting brace 50 positioned at this location can slightly move through the through-opening 61 in the direction toward the front side of the first aerodynamic body A1 and back out of the through-opening 61 in the direction toward the front side of the second aerodynamic body A2.

FIG. 16 shows a schematic perspective representation of an important section of an inventive wing unit arrangement or arrangement with at least one aerodynamic body for an aircraft according to another embodiment. This wing unit arrangement is formed by at least one first, movable aerodynamic body that is realized in the form of a pivoted flap 64 in this exemplary embodiment. The flap 64, of which only the region near the front side is illustrated in the drawings, has an aerodynamically active profile and a certain wingspread. The front side of the flap 64 that points in the wingspread direction is arranged adjacent to and spaced apart from a front side of a (not-shown) structural component that is stationary referred to the flap 64 and may be a component of a fuselage or an airfoil by a (not-shown) variable gap. The stationery structural component may consist, for example, of the fuselage body of the aircraft or a wing connecting region or the like. The flap 64 is held in a pivoted fashion on its front side by means of a flap mounting 66 fixed on the structural component. However, it also may be alternatively or additionally fixed in a movable fashion on another component such as, e.g., an airfoil body. In such a configuration, the front sides of the flap 64 and the structural component that lie adjacent to one another can move relative to one another and thusly change the size and/or shape of the variable gap 25 during a movement of the flap 64, namely in a fashion similar to that described with reference to the preceding exemplary embodiments.

In order to seal the gap, a gap bridge-over device 1 realized in the form of an end cap is once again provided in this case. In this exemplary embodiment, the end cap or gap bridge-over device 1 seals the gap in the nose or leading edge region referred to the profiled shape of the flap while the seal on the trailing edge region is realized with a conventional seal (see below). The shape of the end cap or gap bridge-over device 1 is at least adapted to the shape of the aerodynamic profile of the flap 64. The end cap or gap bridge-over device 1 is once again arranged on the front end of the flap 64 and can be telescopically displaced on the flap 64 essentially in the wingspread direction thereof. Similar to the above-described embodiments, the gap bridge-over device 1 may be inserted into the front side or attached to the front end of the flap 64 or be displaceably supported in another suitable fashion. The end cap or gap bridge-over device 1 can be brought in contact with the front side of the adjacent structural component and thusly seals the variable gap. Part of the flap mounting 66 extends through an opening in the end cap 12.

According to FIG. 17 that shows a schematic perspective representation of the wing unit arrangement in the viewing direction of the arrow XVII in FIG. 17, the wing unit arrangement according to this exemplary embodiment comprises two pressing devices 40 that may be realized analogous to those described above with reference to the exemplary embodiments illustrated in FIGS. 10 to 13 and ensure that the gap bridge-over device 1 is reliably pressed against the assigned front side of the adjacent structural component and therefore seals the variable gap in any state of adjustment of the flap or the aerodynamic body, respectively.

In order to improve the gap seal, the displaceable end cap or gap bridge-over device 1 may be provided with a peripheral sealing profile 68 on its front side (see FIG. 16). This sealing profile 68 may be realized, e.g., in the form of a moulded rubber part that is vulcanized on the end cap 12 or gap bridge-over device 1 itself or on a separate carrier cap 70 that forms the region on the front side of the gap bridge-over device 1 as in the example illustrated in FIG. 16. This sealing profile 68 adjoins and seals the front side of the adjacent structural component or a second front side sealing profile arranged, if applicable, at this location in all flap positions under the influence of the pressing devices or spring units 40. Similar to the embodiment according to FIG. 10, the end cap or gap bridge-over device 1 furthermore features peripheral sealing profiles 72 on its circumferential region and on the outer surface region of the flap 64 such that the end cap or gap bridge-over device 1 is also sealed during a displacement relative to the flap 64.

The invention is not restricted to the above-described exemplary embodiments that merely serve for the general explanation of the central idea of the invention. The characteristics or components or parts of exemplary embodiments can also be applied to the other described embodiments with respect to their basic function. Depending on the arrangement of the aerodynamic bodies A1, A2 or wing unit components used and the mounting of components assigned thereto, the terms "first" and "second" aerodynamic body or wing unit component used in the preceding description and in the claims may also be interchanged.

Figure 18:
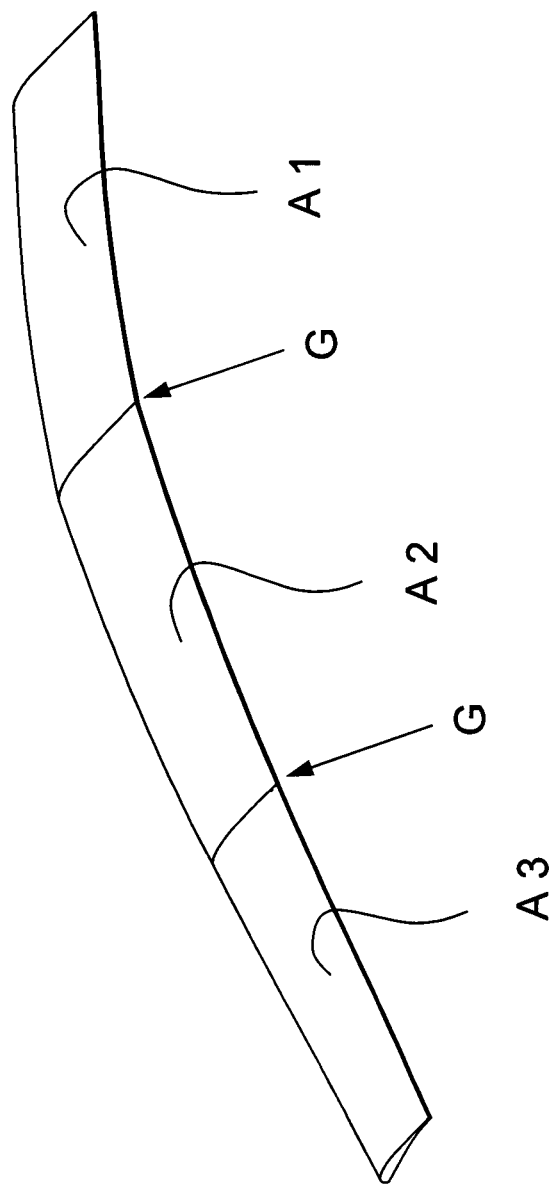
FIG. 18 shows a schematic perspective representation of an arrangement of the aerodynamic bodies.

The inventive objects may also contain an arrangement of more than two aerodynamic bodies, for example, three aerodynamic bodies as illustrated in FIG. 18. The three aerodynamic bodies may respectively feature the above-described characteristics and collectively feature the above-described combinations of characteristics.

Although the inventive wing unit arrangement was described with reference to landing flaps in the above examples, it may naturally also be realized in connection with other wing unit components such as, e.g., slats, spoilers, ailerons or the like. These wing unit components may, in particular, also carry out oscillating (equidirectional) adjusting movements (i.e., for example, downward as well as upward flap excursions), wherein effects similar to those described above occur and change the size and/or shape of the variable gap.

It is furthermore also possible that the gap bridge-over device 1 or the gap closing element or end cap features several profiled parts with the described characteristics that can be telescopically pushed into one another. The end cap may also be realized in the form of an attachment element that can essentially be displaced in the wingspread direction and is arranged in front of the front side of the corresponding wing unit component. In such a solution, however, additional sealing or lining elements are usually required between the front side and the end cap.

The above-described coupling elements may alternatively be realized in the form of a suitable kinematic gear mechanisms or even cable-like elements, etc. Instead of the above-described coupling elements or spring units, it would also be conceivable, in principle, to provide other suitable actuators for the end cap or the gap bridge-over device or the gap closing element, e.g., mechanic, electric, piezoelectric, pneumatic or hydraulic drives or the like, as well as hybrid forms thereof. However, these actuators are usually heavier than the coupling elements or spring units. If a separate actuator or spring unit is used for displacing the end cap or the gap bridge-over device 1 instead of the coupling elements, these drive units may also be arranged, e.g., in the aerodynamic body that does not contain the displaceable end cap (in FIG. 11, e.g., the first aerodynamic body A1) and pull the end cap against the front side of this wing unit component, e.g., in the form of kinematic reversal.

Depending on the embodiment, it may also be advantageous to provide a guiding device for the end cap or the gap bridge-over device that features more than two guide elements. In this respect, the optimal number of guide elements depends, in particular, on the corresponding dimensions of the respective components, the respective functional correlations and the installation conditions.

The sealing devices or elements used within the scope of the inventive solution may either be attached to the respective component separably, i.e., such that they can be installed and removed manually or with simple installation tools, or inseparably, i.e., such that they need to be destroyed in order to be removed. An inseparable attachment may be realized, e.g., by vulcanizing on the sealing device.

The invention claimed is:

1. An airfoil for an aircraft including at least one aerodynamic body that can be adjusted relative to a main wing of the aircraft by means of an adjusting device, wherein a gap between the at least one aerodynamic body and another aerodynamic body or a component of the fuselage or the main wing is formed on one lateral end and said gap is variable due to the adjustability of the at least one aerodynamic body, featuring a gap bridge-over device with a shell part that extends along the gap and overlaps an outer shell of the at least one aerodynamic body in a wingspread direction on the front side thereof in such a way that the shell part can be telescopically moved relative to the at least one aerodynamic body in the wingspread direction wherein:

the gap bridge-over device features a coupling rib that is connected to the shell part, the coupling rib having a first side opposite a second side, and a first coupling device for coupling the first side of the coupling rib to a structural component of the at least one aerodynamic body and a second coupling device, and the first coupling device features at least one first connecting part that extends transverse to a chord direction and at least one second connecting part that extends transverse to a chord direction, the at least one first connecting part spaced apart from the at least one second connecting part in the chord direction, said at least one first connecting part is coupled to the first side of the coupling rib by means of an articulated connection that is constrained to extend substantially along a longitudinal direction of the at least one first connecting part and the at least one first connecting part is extendable along the longitudinal direction of the at least one first connecting part in order to displace the shell part in the wingspread direction, said at least one second connecting part is coupled to the first side of the coupling rib by means of an articulated connection that is constrained to extend substantially along a longitudinal direction of the at least one second connecting part and the at least one second connecting part is extendable along the longitudinal direction of the at least one second connecting part in order to displace the shell part in the wingspread direction, said at least one first connecting part is formed as a rod which is guided for telescopic linear movement in the longitudinal direction of the at least one first connecting part and in the wingspread direction on the at least one aerodynamic body, said at least one second connecting is formed as a rod which is guided for telescopic linear movement in the longitudinal direction of the at least one second connecting part and in the wingspread direction on the at least one aerodynamic body, and the second coupling device includes at least two connecting rods that are arranged spaced apart from one another in the chord direction, each of the at least two connecting rods including a first end and a second end, the first end of each of the at least two connecting rods including an articulation to couple the first end of each of the at least two connecting rods to the at least one aerodynamic body and the second end of each of the at least two connecting rods including an articulation to couple the second end of each of the at least two connecting rods to the second side of the coupling rib.

2. The airfoil according to claim 1, wherein the shell part is positioned outside a skin of the at least one aerodynamic body.

3. The airfoil according to claim 1, wherein the shell part is positioned inside a skin of the at least one aerodynamic body.

4. The airfoil according to claim 1, wherein a sealing device is arranged on the gap bridge-over device.

5. The airfoil according to claim 1, wherein the second coupling device features a pressing device between a supporting component of the at least one aerodynamic body and the coupling rib such that the pressing device presses the gap bridge-over device outward and away from an interior of the at least one aerodynamic body.

6. The airfoil according to claim 4, wherein the sealing device is arranged on a first side of the gap bridge-over device that lies opposite of a second side of the gap bridge-over device, and the second side of the gap bridge-over device overlaps an adjacent skin of the at least one aerodynamic body.

7. The airfoil according to claim 4, wherein the sealing device is, referred to the coupling rib, arranged on the shell part and on a side that is positioned near an overlapping region.

8. The airfoil according to claim 5, wherein the pressing device features a telescopic rod that is prestressed in the direction toward the outer side of the at least one aerodynamic body.

9. An airfoil for an aircraft with a main wing and a plurality of aerodynamic bodies that are arranged adjacent to one another transverse to a chord direction and can be adjusted relative to the main wing by means of an adjusting device, wherein a gap is formed between the facing ends of outer shells of the aerodynamic bodies and said gap is variable due to the adjustability of the aerodynamic bodies, featuring a gap bridge-over device that includes a coupling rib having a first side opposite a second side, a first coupling device and a second coupling device, the first coupling device including at least one first connecting part that extends transverse to a chord direction and at least one second connecting part that extends transverse to a chord direction, and the at least one first connecting part is coupled to the first side of the coupling rib by means of an articulated connection that is constrained to extend substantially along a longitudinal direction of the at least one first connecting part and the at least one first connecting part is extendable along the longitudinal direction of the at least one first connecting part, and the second coupling device is coupled to the second side of the coupling rib, the second coupling device including at least two connecting rods that are arranged spaced apart from one another in the chord direction, each of the at least two connecting rods including a first end and a second end, the first end of each of the at least two connecting rods including an articulation to couple the first end of each of the at least two connecting rods to one of the aerodynamic bodies and the second end of each of the at least two connecting rods including an articulation to couple the second end of each of the at least two connecting rods to the second side of the coupling rib, wherein the at least one first connecting part is formed as a rod which is guided for telescopic linear movement in the longitudinal direction of the at least one first connecting part and in a wingspread direction on one of the plurality of aerodynamic bodies.

10. The airfoil according to claim 9, wherein the gap bridge-over device features:
a shell part that at least sectionally extends along a contour of the outer shells of the aerodynamic bodies on the gap,
the coupling rib connected to the shell part,
the first coupling device for coupling the coupling rib to a first aerodynamic body of the plurality of aerodynamic bodies in an articulated fashion, and
the second coupling device for coupling the coupling rib to a second aerodynamic body of the plurality of aerodynamic bodies positioned adjacent to first aerodynamic body in an articulated fashion.

11. An aircraft with an airfoil according to claim 9.

12. The airfoil according to claim 10, wherein the second coupling device features a pressing device between a supporting component of the second aerodynamic body and the coupling rib such that the pressing device presses the gap bridge-over device outward and away from an interior of the second aerodynamic body.

13. The airfoil according to claim 10, wherein:
a gap bridge-over device with a coupling device is respectively arranged on the first aerodynamic body and the second aerodynamic body and can be telescopically moved thereon, and
said coupling device features a pressing device between a supporting component of the second aerodynamic body and the coupling rib.

14. An airfoil for an aircraft with a main wing and an aerodynamic body with an aerodynamically active profile that can be adjusted relative to the main wing by means of an adjusting device and is arranged adjacent to a component of a fuselage or the main wing transverse to a chord direction, wherein a gap is formed between one end of an outer shell of the aerodynamic body and the component of the fuselage or the main wing and said gap is variable due to the adjustability of the aerodynamic body, featuring a gap bridge-over device that includes a coupling rib having a first side opposite a second side, a first coupling device and a second coupling device, the first coupling device including a first connecting part that extends transverse to the chord direction and the first connecting part is coupled to the first side of the coupling rib by means of an articulated connection that is constrained to extend substantially along the longitudinal direction of the first connecting part and is extendable along the longitudinal direction of the first connecting part, the second coupling device is coupled to the second side of the coupling rib, the second coupling device including at least two connecting rods that arc arranged spaced apart from one another in the chord direction, each of the at least two connecting rods including a first end and a second end, the first end of each of the at least two connecting rods including an articulation to couple the first end of each of the at least two connecting rods to the aerodynamic body and the second end of each of the at least two connecting rods including an articulation to couple the second end of each of the at least two connecting rods to the second side of the coupling rib, wherein the first connecting part .s formed as a rod which is guided on the aerodynamic body for telescopic linear movement along a longitudinal axis of the rod, the longitudinal axis extending in a wingspread direction.

15. The airfoil according to claim 14, wherein the gap bridge-over device features:
  a shell part that at least sectionally extends along a contour of the outer shell of the aerodynamic body on the gap, and
  the coupling rib connected to the shell.

16. The airfoil according to claim 14, wherein:
  a gap bridge-over device with a coupling device is respectively arranged on the first aerodynamic body and the component and can be telescopically moved thereon, and
  said coupling device features a pressing device between a supporting component of the second aerodynamic body and the coupling rib.

17. The airfoil according to claim 15, wherein the first or second coupling device features a pressing device between a supporting component of the component or the aerodynamic body and the coupling rib such that the pressing device presses the gap bridge-over device outward and away from the interior of the second aerodynamic body or the component.

* * * * *